United States Patent
Valentine et al.

(10) Patent No.: US 11,288,068 B2
(45) Date of Patent: Mar. 29, 2022

(54) SYSTEMS, METHODS, AND APPARATUS FOR MATRIX MOVE

(71) Applicant: Intel Corporation, Santa Clara, CA (US)

(72) Inventors: Robert Valentine, Kiryat Tivon (IL); Zeev Sperber, Zichron Yackov (IL); Mark J. Charney, Lexington, MA (US); Bret L. Toll, Hillsboro, OR (US); Jesus Corbal, King City, OR (US); Dan Baum, Haifa (IL); Alexander Heinecke, San Jose, CA (US); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/487,747

(22) PCT Filed: Jul. 1, 2017

(86) PCT No.: PCT/US2017/040545
§ 371 (c)(1),
(2) Date: Aug. 21, 2019

(87) PCT Pub. No.: WO2018/174934
PCT Pub. Date: Sep. 27, 2018

(65) Prior Publication Data
US 2020/0233665 A1 Jul. 23, 2020

Related U.S. Application Data

(60) Provisional application No. 62/473,732, filed on Mar. 20, 2017.

(51) Int. Cl.
*G06F 9/30* (2018.01)
*G06F 7/485* (2006.01)
(Continued)

(52) U.S. Cl.
CPC .......... *G06F 9/30036* (2013.01); *G06F 7/485* (2013.01); *G06F 7/4876* (2013.01);
(Continued)

(58) Field of Classification Search
None
See application file for complete search history.

(56) References Cited

U.S. PATENT DOCUMENTS

| | | |
|---|---|---|
| 4,310,879 A | 1/1982 | Pandeya |
| 5,025,407 A | 6/1991 | Gulley et al. |

(Continued)

FOREIGN PATENT DOCUMENTS

| | | |
|---|---|---|
| EP | 3547120 A1 | 10/2019 |
| EP | 3646169 A1 | 5/2020 |

(Continued)

OTHER PUBLICATIONS

Exposing Memory Access Patterns to Improve Instruction and Memory Efficiency in GPUs by Neal C. Crago et al., ACM Transactions on Architecture and Code Optimization, vol. 15, No. 4, Article 45. Publication date: Oct. 2018. (Year: 2018).

(Continued)

*Primary Examiner* — Michael Sun
(74) *Attorney, Agent, or Firm* — Nicholson De Vos Webster & Elliott, LLP

(57) ABSTRACT

Detailed herein are embodiment systems, processors, and methods for matrix move. For example, a processor comprising decode circuitry to decode an instruction having fields for an opcode, a source matrix operand identifier, and a destination matrix operand identifier; and execution circuitry to execute the decoded instruction to move each data element of the identified source matrix operand to corresponding data element position of the identified destination matrix operand is described.

17 Claims, 36 Drawing Sheets

(51) Int. Cl.
  *G06F 7/487* (2006.01)
  *G06F 17/16* (2006.01)
  *G06F 7/76* (2006.01)
  *G06F 9/38* (2018.01)

(52) U.S. Cl.
  CPC ............ *G06F 7/762* (2013.01); *G06F 9/3001* (2013.01); *G06F 9/3016* (2013.01); *G06F 9/30043* (2013.01); *G06F 9/30109* (2013.01); *G06F 9/30112* (2013.01); *G06F 9/30134* (2013.01); *G06F 9/30145* (2013.01); *G06F 9/30149* (2013.01); *G06F 9/30185* (2013.01); *G06F 9/30196* (2013.01); *G06F 9/3818* (2013.01); *G06F 9/3836* (2013.01); *G06F 17/16* (2013.01); *G06F 2212/454* (2013.01)

(56) References Cited

U.S. PATENT DOCUMENTS

| | | |
|---|---|---|
| 5,170,370 A | 12/1992 | Lee et al. |
| 5,247,632 A | 9/1993 | Newman |
| 5,426,378 A | 6/1995 | Ong |
| 5,475,822 A | 12/1995 | Sibigtroth et al. |
| 5,584,027 A | 12/1996 | Smith |
| 5,682,544 A | 10/1997 | Pechanek et al. |
| 5,761,466 A | 6/1998 | Chau |
| 5,765,216 A | 6/1998 | Weng et al. |
| 5,887,183 A | 3/1999 | Agarwal et al. |
| 5,892,962 A | 4/1999 | Jocelyn |
| 6,041,403 A | 3/2000 | Parker et al. |
| 6,069,489 A | 5/2000 | Iwanczuk et al. |
| 6,134,578 A | 10/2000 | Ehlig et al. |
| 6,161,219 A | 12/2000 | Ramkumar et al. |
| 6,212,112 B1 | 4/2001 | Naura et al. |
| 6,332,186 B1 | 12/2001 | Elwood et al. |
| 6,487,171 B1 | 11/2002 | Honig et al. |
| 6,487,524 B1 | 11/2002 | Preuss |
| 6,505,288 B1 | 1/2003 | Jang et al. |
| 6,643,765 B1 | 11/2003 | Hansen et al. |
| 6,647,484 B1 | 11/2003 | Jiang et al. |
| 6,831,654 B2 | 12/2004 | Pether et al. |
| 6,877,020 B1 | 4/2005 | Bratt et al. |
| 6,944,747 B2 * | 9/2005 | Nair .................. G06F 9/30145 712/35 |
| 7,003,542 B2 | 2/2006 | Devir |
| 7,016,418 B2 | 3/2006 | Wang et al. |
| 7,107,436 B2 | 9/2006 | Moyer |
| 7,209,939 B2 | 4/2007 | Castrapel et al. |
| 7,275,148 B2 | 9/2007 | Moyer et al. |
| 7,430,578 B2 | 9/2008 | Debes et al. |
| 7,610,466 B2 | 10/2009 | Moyer |
| 7,672,389 B2 | 3/2010 | Gueguen |
| 7,725,521 B2 | 5/2010 | Chen et al. |
| 7,792,895 B1 | 9/2010 | Juffa et al. |
| 7,873,812 B1 | 1/2011 | Mimar |
| 7,912,889 B1 | 3/2011 | Juffa et al. |
| 7,932,910 B2 | 4/2011 | Hansen et al. |
| 8,040,349 B1 | 10/2011 | Danskin |
| 8,051,124 B2 | 11/2011 | Salama et al. |
| 8,374,284 B2 | 2/2013 | Watson |
| 8,392,487 B1 | 3/2013 | Mesh et al. |
| 8,577,950 B2 | 11/2013 | Eichenberger et al. |
| 8,760,994 B2 | 6/2014 | Wang et al. |
| 8,817,033 B2 | 8/2014 | Hur et al. |
| 8,825,988 B2 | 9/2014 | Rupley et al. |
| 8,904,148 B2 * | 12/2014 | Claydon ............ G06F 15/8023 712/11 |
| 8,943,119 B2 | 1/2015 | Hansen et al. |
| 8,984,043 B2 | 3/2015 | Ginzburg et al. |
| 9,098,460 B2 | 8/2015 | Yanagisawa |
| 9,442,723 B2 | 9/2016 | Yang et al. |
| 9,519,947 B2 | 12/2016 | Nickolls et al. |
| 9,557,998 B2 | 1/2017 | Ould-Ahmed-Vall et al. |
| 9,703,708 B2 | 7/2017 | Alameldeen et al. |
| 9,906,359 B2 | 2/2018 | Gueron |
| 9,960,907 B2 | 5/2018 | Gueron |
| 9,996,350 B2 | 6/2018 | Lee et al. |
| 10,275,243 B2 | 4/2019 | Grochowski et al. |
| 10,535,114 B2 | 1/2020 | Bolz |
| 10,600,475 B2 | 3/2020 | Yadavalli |
| 10,620,951 B2 * | 4/2020 | Azizi .................. G06F 9/3001 |
| 10,649,772 B2 * | 5/2020 | Bradford ............ G06F 9/30109 |
| 10,719,323 B2 * | 7/2020 | Baum ................ G06F 9/30025 |
| 10,846,087 B2 | 11/2020 | Plotnikov et al. |
| 10,896,043 B2 * | 1/2021 | Toll ...................... G06F 9/3016 |
| 2002/0032710 A1 * | 3/2002 | Saulsbury ........... G06F 9/30109 708/400 |
| 2003/0038547 A1 | 2/2003 | Reinhardt et al. |
| 2003/0126176 A1 | 7/2003 | Devir |
| 2003/0221089 A1 | 11/2003 | Spracklen |
| 2004/0097856 A1 | 5/2004 | Cipra et al. |
| 2004/0111587 A1 | 6/2004 | Nair et al. |
| 2004/0228295 A1 | 11/2004 | Zhang et al. |
| 2005/0053012 A1 | 3/2005 | Moyer |
| 2005/0055534 A1 | 3/2005 | Moyer |
| 2005/0055535 A1 | 3/2005 | Moyer et al. |
| 2005/0055543 A1 | 3/2005 | Moyer |
| 2005/0094893 A1 | 5/2005 | Samadani |
| 2005/0193050 A1 | 9/2005 | Ali |
| 2005/0289208 A1 | 12/2005 | Harrison et al. |
| 2006/0095721 A1 | 5/2006 | Biles et al. |
| 2006/0101245 A1 | 5/2006 | Nair et al. |
| 2006/0190517 A1 | 8/2006 | Guerrero |
| 2007/0006231 A1 | 1/2007 | Wang et al. |
| 2007/0126474 A1 | 6/2007 | Chang et al. |
| 2007/0186210 A1 | 8/2007 | Hussain et al. |
| 2007/0271325 A1 | 11/2007 | Juffa et al. |
| 2007/0280261 A1 | 12/2007 | Szymanski |
| 2008/0031545 A1 | 2/2008 | Nowicki et al. |
| 2008/0071851 A1 | 3/2008 | Zohar et al. |
| 2008/0140994 A1 | 6/2008 | Khailany et al. |
| 2008/0162824 A1 | 7/2008 | Jalowiecki et al. |
| 2008/0208942 A1 | 8/2008 | Won et al. |
| 2008/0301414 A1 | 12/2008 | Pitsianis et al. |
| 2009/0006816 A1 | 1/2009 | Hoyle et al. |
| 2009/0043836 A1 | 2/2009 | Dupaquis et al. |
| 2009/0113170 A1 * | 4/2009 | Abdallah ............ G06F 9/30181 712/17 |
| 2009/0172365 A1 | 7/2009 | Orenstien et al. |
| 2009/0196103 A1 | 8/2009 | Kim |
| 2009/0292758 A1 | 11/2009 | Brokenshire et al. |
| 2009/0300091 A1 | 12/2009 | Brokenshire et al. |
| 2009/0300249 A1 | 12/2009 | Moyer et al. |
| 2010/0106692 A1 | 4/2010 | Moloney |
| 2010/0180100 A1 | 7/2010 | Lu et al. |
| 2010/0199247 A1 | 8/2010 | Huynh et al. |
| 2010/0325187 A1 | 12/2010 | Juffa et al. |
| 2011/0040821 A1 | 2/2011 | Eichenberger et al. |
| 2011/0040822 A1 | 2/2011 | Eichenberger et al. |
| 2011/0072065 A1 | 3/2011 | Mimar |
| 2011/0153707 A1 | 6/2011 | Ginzburg et al. |
| 2012/0011348 A1 | 1/2012 | Eichenberger et al. |
| 2012/0079252 A1 | 3/2012 | Sprangle |
| 2012/0113133 A1 | 5/2012 | Shpigelblat |
| 2012/0137074 A1 | 5/2012 | Kim et al. |
| 2012/0144130 A1 | 6/2012 | Fossum |
| 2012/0254588 A1 | 10/2012 | Adrian et al. |
| 2012/0254592 A1 | 10/2012 | San et al. |
| 2012/0290608 A1 | 11/2012 | Dantressangle et al. |
| 2012/0314774 A1 | 12/2012 | Yang et al. |
| 2013/0016786 A1 | 1/2013 | Segall |
| 2013/0042093 A1 | 2/2013 | Van et al. |
| 2013/0076761 A1 | 3/2013 | Ellis et al. |
| 2013/0262548 A1 | 10/2013 | Ge et al. |
| 2013/0305020 A1 | 11/2013 | Valentine et al. |
| 2013/0339668 A1 | 12/2013 | Ould-Ahmed-Vall et al. |
| 2014/0019713 A1 | 1/2014 | Ould-Ahmed-Vall et al. |
| 2014/0032876 A1 | 1/2014 | Burkart et al. |
| 2014/0149480 A1 | 5/2014 | Catanzaro et al. |
| 2014/0157287 A1 | 6/2014 | Howes et al. |
| 2014/0172937 A1 | 6/2014 | Linderman et al. |
| 2014/0281432 A1 * | 9/2014 | Anderson ............... G06F 9/384 712/226 |

(56) References Cited

U.S. PATENT DOCUMENTS

| | | | |
|---|---|---|---|
| 2015/0052333 A1 | 2/2015 | Hughes et al. | |
| 2015/0067302 A1 | 3/2015 | Gueron | |
| 2015/0135195 A1 | 5/2015 | Khare et al. | |
| 2015/0154024 A1* | 6/2015 | Anderson | G06F 9/30112 712/208 |
| 2015/0199266 A1 | 7/2015 | Franchetti et al. | |
| 2015/0242267 A1 | 8/2015 | Modarresi | |
| 2015/0378734 A1 | 12/2015 | Hansen et al. | |
| 2016/0011870 A1 | 1/2016 | Plotnikov et al. | |
| 2016/0165321 A1 | 6/2016 | Denoual et al. | |
| 2016/0188337 A1 | 6/2016 | Lee et al. | |
| 2016/0239706 A1 | 8/2016 | Dijkman et al. | |
| 2016/0246619 A1 | 8/2016 | Chang et al. | |
| 2017/0053375 A1 | 2/2017 | Bolz | |
| 2017/0097824 A1 | 4/2017 | Elmer et al. | |
| 2017/0220352 A1 | 8/2017 | Woo et al. | |
| 2017/0337156 A1 | 11/2017 | Yadavalli | |
| 2018/0004510 A1 | 1/2018 | Grochowski et al. | |
| 2018/0113708 A1 | 4/2018 | Corbal et al. | |
| 2018/0189227 A1 | 7/2018 | Korthikanti et al. | |
| 2018/0321938 A1 | 11/2018 | Boswell et al. | |
| 2019/0042202 A1 | 2/2019 | Sade et al. | |
| 2019/0042248 A1 | 2/2019 | Bradford et al. | |
| 2019/0042256 A1 | 2/2019 | Sade et al. | |
| 2019/0042541 A1 | 2/2019 | Sade et al. | |
| 2019/0042542 A1 | 2/2019 | Narayanamoorthy et al. | |
| 2019/0121837 A1 | 4/2019 | Azizi et al. | |
| 2019/0205137 A1 | 7/2019 | Meadows et al. | |
| 2019/0347310 A1 | 11/2019 | Valentine et al. | |
| 2020/0065352 A1 | 2/2020 | Valentine et al. | |
| 2020/0097291 A1 | 3/2020 | Hughes et al. | |
| 2020/0210517 A1 | 7/2020 | Baum et al. | |
| 2020/0233666 A1 | 7/2020 | Valentine et al. | |
| 2020/0233667 A1 | 7/2020 | Valentine et al. | |

FOREIGN PATENT DOCUMENTS

| | | |
|---|---|---|
| KR | 10-2011-0079495 A | 7/2011 |
| WO | 2004/053841 A2 | 6/2004 |
| WO | 2006/081094 A2 | 8/2006 |
| WO | 2007/143278 A2 | 12/2007 |
| WO | 2008/037975 A2 | 4/2008 |
| WO | 2013/048369 A1 | 4/2013 |
| WO | 2016/003740 A1 | 1/2016 |
| WO | 2016/075158 A1 | 5/2016 |
| WO | 2016/105727 A1 | 6/2016 |
| WO | 2016/105841 A1 | 6/2016 |
| WO | 2018/125250 A1 | 7/2018 |
| WO | 2018/174927 A1 | 9/2018 |
| WO | 2019/002811 A1 | 1/2019 |

OTHER PUBLICATIONS

'Brief Introduction to Vectors and Matrices' archived from unf.edu on Dec. 30, 2008. (Year: 2008).

'Incompatibilities with MATLAB in Variable-Size Support for Code Generation' by MathWorks, archive from 2015. (Year: 2015).

'Instruction Decoders and Combinatorial Circuits' from lateblt.tripod, archived from Nov. 2016. (Year: 2016).

'Zeroing one or more matrix rows or columns' from Stackoverflow, Apr. 2015. (Year: 2015).

Corrected Notice of Allowability, U.S. Appl. No. 15/201,442, dated Jan. 22, 2019, 5 pages.

Corrected Notice of Allowability, U.S. Appl. No. 15/201,442, dated Mar. 11, 2019, 2 pages.

International Preliminary Report on Patentability, PCT App. No. PCT/US2017/040536, dated Oct. 3, 2019, 10 pages.

International Preliminary Report on Patentability, PCT App. No. PCT/US2017/040537, dated Oct. 3, 2019, 10 pages.

International Preliminary Report on Patentability, PCT App. No. PCT/US2017/040538, dated Oct. 3, 2019, 10 pages.

International Preliminary Report on Patentability, PCT App. No. PCT/US2017/040539, dated Oct. 3, 2019, 11 pages.

International Preliminary Report on Patentability, PCT App. No. PCT/US2017/040540, dated Oct. 3, 2019, 9 pages.

International Preliminary Report on Patentability, PCT App. No. PCT/US2017/040541, dated Oct. 3, 2019, 10 pages.

International Preliminary Report on Patentability, PCT App. No. PCT/US2017/040543, dated Oct. 3, 2019, 11 pages.

International Preliminary Report on Patentability, PCT App. No. PCT/US2017/040544, dated Oct. 3, 2019, 11 pages.

International Preliminary Report on Patentability, PCT App. No. PCT/US2017/040545, dated Oct. 3, 2019, 10 pages.

International Preliminary Report on Patentability, PCT App. No. PCT/US2017/040546, dated Oct. 3, 2019, 10 pages.

International Preliminary Report on Patentability, PCT App. No. PCT/US2017/040547, dated Jan. 16, 2020, 12 pages.

International Preliminary Report on Patentability, PCT App. No. PCT/US2017/040548, dated Oct. 3, 2019, 10 pages.

International Search Report and Written Opinion, PCT App. No. PCT/US2017/040534, dated Jan. 3, 2018, 11 pages.

International Search Report and Written Opinion, PCT App. No. PCT/US2017/040536, dated Dec. 20, 2017, 11 pages.

International Search Report and Written Opinion, PCT App. No. PCT/US2017/040537, dated Dec. 20, 2017, 11 pages.

International Search Report and Written Opinion, PCT App. No. PCT/US2017/040538, dated Jan. 9, 2018, 12 pages.

International Search Report and Written Opinion, PCT App. No. PCT/US2017/040539, dated Dec. 20, 2017, 12 pages.

International Search Report and Written Opinion, PCT App. No. PCT/US2017/040540, dated Jan. 3, 2018, 14 pages.

International Search Report and Written Opinion, PCT App. No. PCT/US2017/040541, dated Dec. 20, 2017, 11 pages.

International Search Report and Written Opinion, PCT App. No. PCT/US2017/040543, dated Dec. 14, 2017, 15 pages.

International Search Report and Written Opinion, PCT App. No. PCT/US2017/040544, dated Dec. 14, 2017, 13 pages.

International Search Report and Written Opinion, PCT App. No. PCT/US2017/040545, dated Jan. 3, 2018, 11 pages.

International Search Report and Written Opinion, PCT App. No. PCT/US2017/040546, dated Jan. 24, 2018, 15 pages.

International Search Report and Written Opinion, PCT App. No. PCT/US2017/040547, dated Mar. 30, 2018, 15 pages.

International Search Report and Written Opinion, PCT App. No. PCT/US2017/040548, dated Dec. 20, 2017, 17 pages.

Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.

Non-Final Office Action, U.S. Appl. No. 15/201,442, dated May 4, 2018, 11 pages.

Non-Final Office Action, U.S. Appl. No. 16/398,200, dated Jul. 28, 2020, 17 pages.

Non-Final Office Action, U.S. Appl. No. 16/487,766, dated Aug. 3, 2020, 13 pages.

Non-Final Office Action, U.S. Appl. No. 16/487,784, dated Aug. 3, 2020, 19 pages.

Notice of Allowance, U.S. Appl. No. 15/201,442, dated Dec. 14, 2018, 5 pages.

Corrected Notice of Allowability, U.S. Appl. No. 16/474,483, dated Dec. 1, 2020, 2 pages.

Non Final Office Action, U.S. App. No. 16/487,777, dated Oct. 27, 2020, 12 pages.

Non-Final Office Action, U.S. Appl. No. 16/487,755, dated Nov. 24, 2020, 10 pages.

Non-Final Office Action, U.S. Appl. No. 16/487,774, dated Dec. 21, 2020, 13 pages.

Non-Final Office Action, U.S. Appl. No. 16/487,787, dated Oct. 1, 2020, 16 pages.

Non-Final Office Action, U.S. Appl. No. 16/624,178, dated Jan. 13, 2021, 12 pages.

Notice of Allowance, U.S. Appl. No. 16/474,483, dated Sep. 2, 2020, 9 pages.

Supplementary European Search Report and Search Opinion, EP App. No. 17901884.1, dated Dec. 14, 2020, 12 pages.

(56) References Cited

OTHER PUBLICATIONS

Yang et al., "Research and Design of Dedicated Instruction for Reconfigurable Matrix Multiplication of VLIW Processor", International Conference on Intelligent Networking and Collaborative Systems, 2016, 4 pages.
'CIS-77—The Instruction Cycle' from c-iump.com, 2016. (Year: 2016).
'CLEAR opcode in rpgle-go4as400.com' from Go4AS400, 2016. (Year: 2016).
'Spotlight On: the Fetchdecode Execute Cycle' by Will Fastiggi, 2016. (Year: 2016).
Final Office Action, U.S. Appl. No. 16/487,766, dated Mar. 19, 2021, 18 pages.
Final Office Action, U.S. Appl. No. 16/487,784, dated Mar. 16, 2021, 17 pages.
Non-Final Office Action, U.S. Appl. No. 16/486,960, dated Mar. 3, 2021, 10 pages.
Non-Final Office Action, U.S. Appl. No. 16/474,507, dated May 5, 2021, 6 pages.
Notice of Allowance, U.S. Appl. No. 16/487,755, dated Apr. 1, 2021, 9 pages.
Notice of Allowance, U.S. Appl. No. 16/487,774, dated Jul. 13, 2021, 8 pages.
Notice of Allowance, U.S. Appl. No. 16/487,774, dated Nov. 2, 2021, 8 pages.
Notice of Allowance, U.S. App. No. 16/487,777, dated Mar. 26, 2021, 7 pages.
Notice of Allowance, U.S. Appl. No. 16/487,787, dated Mar. 31, 2021, 10 pages.
Notice of Allowance, U.S. Appl. No. 16/624,178, dated Nov. 2, 2021, 8 pages.
Supplementary European Search Report and Search Opinion, EP App. No. 17901997.1, dated Feb. 25, 2021, 11 pages.
Hardware Acceleration of Matrix Multiplication on a Xilinx FPGA' by Nirav Dave et al., copyright 2007, IEEE. (Year 2007), 4 pages.
High-level opcodes' from unthought.net, 1999. (Year: 1999), 3 pages.
International Preliminary Reporton Patentability, PCT App. No. PCT/US2017/036038, dated Jan. 17, 2019, 14 pages.
Non-Final Office Action, U.S. Appl. No. 16/487,766, dated Sep. 14, 2021, 18 pages.
Non-Final Office Action, U.S. Appl. No. 16/487,784, dated Jul. 26, 2021, 18 pages.
Notice of Allowance, U.S. Appl. No. 16/474,507, dated Aug. 24, 2021, 6 pages.
Notice of Allowance, U.S. Appl. No. 16/486,960, dated Jul. 7, 2021, 8 pages.
Notice of Allowance, U.S. Appl. No. 16/487,747, dated Aug. 11, 2021, 10 pages.
Notice of Allowance, U.S. Appl. No. 16/487,755, dated Jul. 21, 2021, 9 pages.
Notice of Allowance, U.S. Appl. No. 16/624,178, dated Jul. 23, 2021, 11 pages.

\* cited by examiner

ACCUMULATOR 2X INPUT SIZES 1101

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---|---|---|---|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|---|---|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|---|---|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

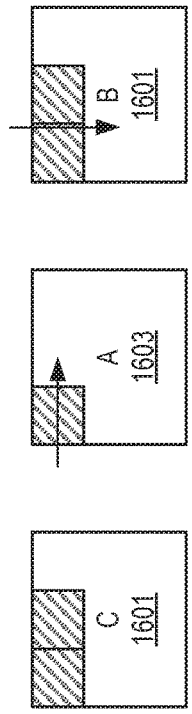

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TMMAPS TMM0, TMM2, TMM3 // UPDATE LEFT TILE OF C
TILELOAD TMM3, R10+R11+N // SRC1 LOADED WITH B FROM NEXT RIGHTMOST TILE
TMMAPS TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 2001 | 0 |
| --- | --- |
| 0 | 0 |
| 0 | 0 |
| 0 | 0 |
| STARTM 2003 ||
| STARTK 2005 ||
| 0 | 0 |
| TMM0 ROWS 2013 | TMM0 COLUMNS 2015 |
| TMM1 ROWS | TMM1 COLUMNS |
| • • • ||
| TMM15 ROWS | TMM15 COLUMNS |
| 0 ||

FIG. 20

```
// FORMAT OF MEMORY PAYLOAD. EACH FIELD IS ABYTE
// 0: PALETTE_ID
// 1-7: RESERVED (MUST BE ZERO)
// 8-9: STARTM(16B)
// 10-11: STARTK(16B)
// 12-15: RESERVED, (MUST BE ZERO)
// 16-17: TILE0ROWSTILE0COLS
// 18-19: TILE1ROWSTILE1COLS
// 20-21: TILE2ROWSTILE2COLS
// ...
// 46-47: TILE15ROWS TILE15COLS
// 48-63: 16B RESERVED, (MUST BE ZERO)
```
TILECONFIG MEM
```
PALETTE_ID := MEM.BYTE[0]
#GP IF PALETTE_ID IS AN UNSUPPORTED PALETTE // FROM CPUID
#GP IF MEM.BYTE[1..7 ISNONZERO
STARTM := MEM.WORD[4] // BYTES 8..9
STARTK := MEM.WORD[5] // BYTES 10..11
#GP IF MEM.BYTE[12..15] ISNONZERO

MAX_NAMES := IMPL.MAX_TILE_BYTES /PALETTE_TABLE[I].TILE_BYTES
MAX_NUM_ROWS := PALETTE_TABLE[PALETTE_ID].TILE_BYTES/
PALETTE_TABLE[PALETTE_ID].BYTES_PER_ROW
P := 16
FOR N IN 0 ...MAX_NAMES-1:
T[N].ROWS :=MEM.BYTE[P++]
T[N].COLS :=MEM.BYTE[P++]
#GP IF T[N].ROWS ==0
#GP IF T[N].COLS ==0
#GP IF T[N].ROWS >MAX_NUM_ROWS
// ALL INSTRUCTIONS CHECK COLUMNS LIMITS BASED ON THEIR ELEMENT
// WIDTHS SO WE DO NOT ENFORCE COLUMN WITH RESTRICTION HERE.

WHILE P < 64: // CONFIRM REST OF BYTES IN 64B CHUNK ARE ZERO
#GP IF MEM.BYTE[P] !=0
P := P +1
FOR N IN 0 ...MAX_NAMES-1:
TILEZERO TILE[N]
TILES_CONFIGURED := 1
```

FIG. 23

```
TILEMOVED TDEST, TSRC

#GP IF TILES_CONFIGURED == 0
#GP IF TSRC.COLS != TDEST.COLS
#GP IF TSRC.ROWS != TDEST.ROWS
#GP IF TDEST.COLS * 4 >
PALETTE_TABLE[PALETTE_ID].BYTES_PER_ROW

FOR I IN 0..TDEST.ROWS-1:
 WRITE_ROW_AND_ZERO(TDEST, I, TSRC.ROW[I], 4 * TDEST.COLS)
ZERO_UPPER_ROWS(TDEST, TDEST.ROWS)

TILEMOVEW TDEST, TSRC

#GP IF TILES_CONFIGURED == 0
#GP IF TSRC.COLS != TDEST.COLS
#GP IF TSRC.ROWS != TDEST.ROWS
#GP IF TDEST.COLS * 2 >
PALETTE_TABLE[PALETTE_ID].BYTES_PER_ROW

FOR I IN 0..TDEST.ROWS-1:
 WRITE_ROW_AND_ZERO(TDEST, I, TSRC.ROW[I], 2 * TDEST.COLS)
ZERO_UPPER_ROWS(TDEST, TDEST.ROWS)
```

VEX PREFIX 2802

[C4] R X B M M M M M W V V V V L P P
     └REX 2805┘ └OPCODE┘ W FIELD 2864  └VVVV FIELD 2820┘ └PREFIX
              MAP                                          ENCODING
              2815                                         FIELD 2825┘
                                                    SIZE
                                                    FIELD 2868

FORMAT
FIELD 2890

MOD R/M BYTE

| 7 6 | 5      3 | 2      0 |
|-----|----------|----------|
| MOD 2842 | REG 2844 | R/M 2846 |

Y Y Y Y Y   W   M M M M M   MOD R/M   SIB
└REAL OPCODE FIELD┘                 2840    2850
         2830

SIB BYTE

| 7 6 | 5      3 | 2      0 |
|-----|----------|----------|
| SS 2852 | XXX 2854 | BBB 2856 |

DISPLACEMENT FIELD
2862

D   IMM8
    2872

FIG. 28B

[C4] P P M M M M M   W   Y Y Y Y Y
     └PREFIX┘ └OPCODE MAP┘   └REAL OPCODE FIELD
     ENCODING      2815           2830
     FIELD 2825
                  DATA ELEMENT
                  WIDTH FIELD 2864
                           BASE OPERATION FIELD
                                    2841

FORMAT        FULL OPCODE FIELD 2874
FIELD 2840

FIG. 28C

| REG 2844 | R/M 2846 | V V V V | XXX 2854 | BBB 2856 |

REGISTER INDEX FIELD 2844
                    VVVV FIELD 2820

R X B
REX 2805

FIG. 29
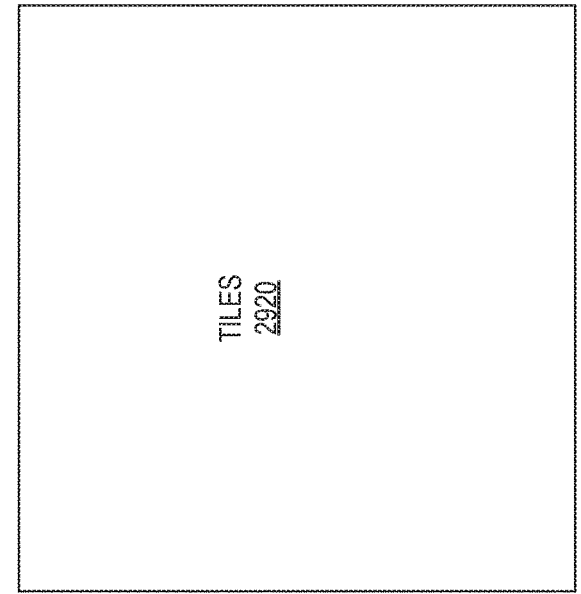
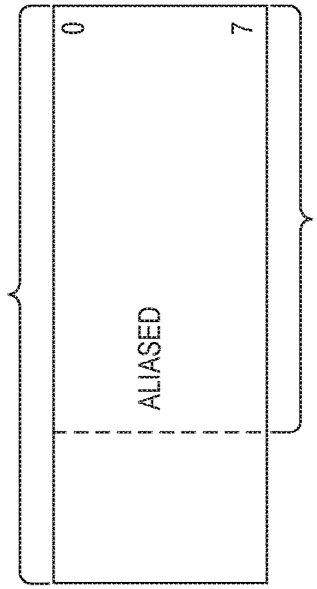
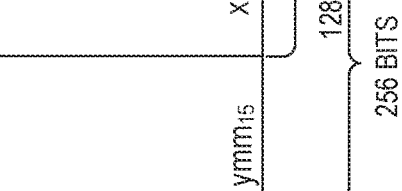
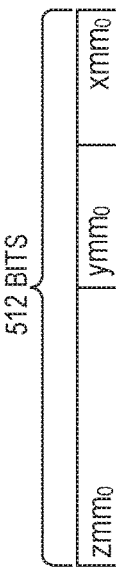
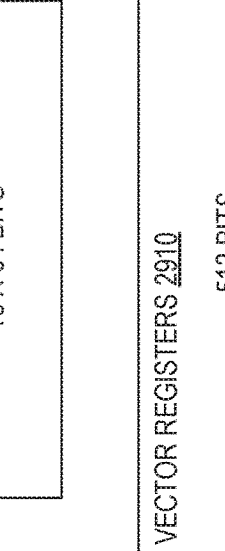

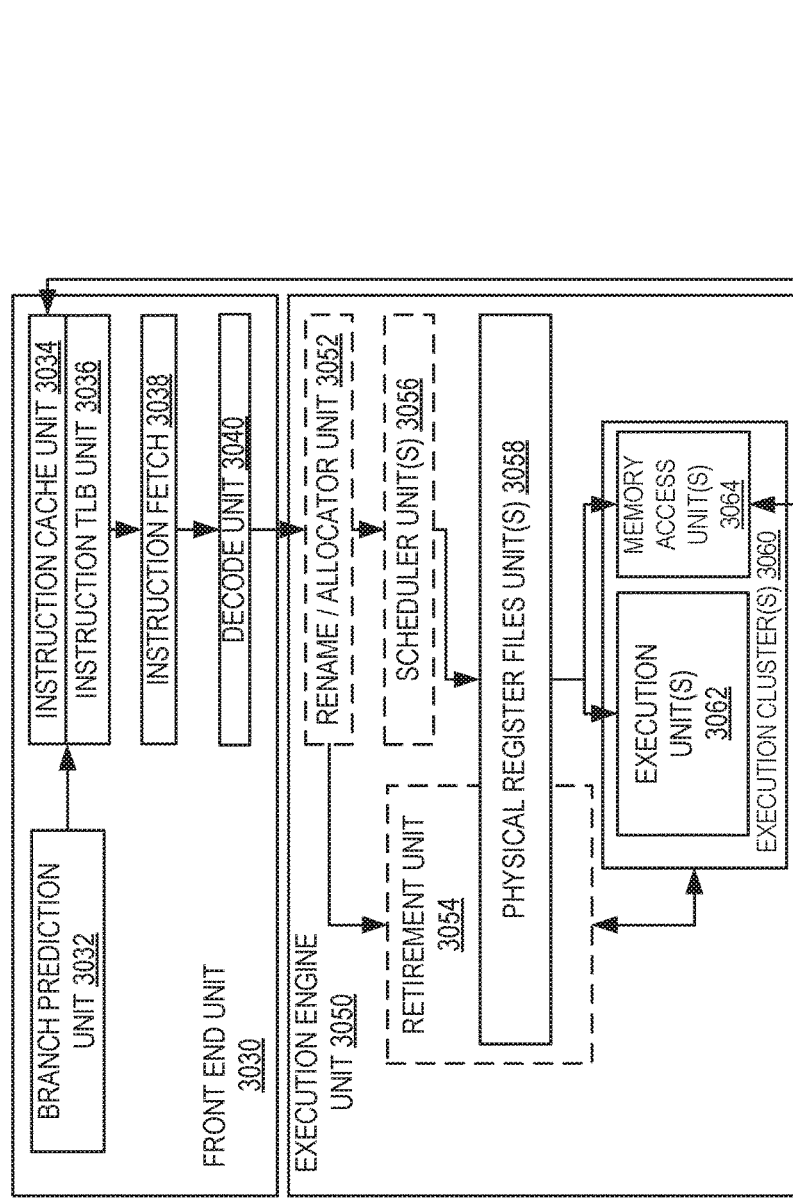

US 11,288,068 B2

SYSTEMS, METHODS, AND APPARATUS FOR MATRIX MOVE

CROSS-REFERENCE TO RELATED APPLICATIONS

This application is a national stage of International Application No. PCT/US2017/040545, filed Jul. 1, 2017, which claims priority to U.S. Provisional Application No. 62/473,732, filed Mar. 20, 2017.

FIELD OF INVENTION

The field of invention relates generally to computer processor architecture, and, more specifically, to matrix manipulation.

BACKGROUND

Matrices are increasingly important in many computing tasks such as machine learning and other bulk data processing.

BRIEF DESCRIPTION OF THE DRAWINGS

The present invention is illustrated by way of example and not limitation in the figures of the accompanying drawings, in which like references indicate similar elements and in which:

FIG. 11 illustrates power-of-two sized SIMD implementations wherein the accumulators use input sizes that are larger than the inputs to the multipliers according to an embodiment;

FIG. 15 illustrates an example of a matrix expressed in row major format and column major format;

FIG. 16 illustrates an example of usage of matrices (tiles);

FIG. 20 illustrates an embodiment of a description of the matrices (tiles) to be supported;

FIG. 23 illustrates exemplary pseudocode for an execution of a TILECONFIG instruction;

FIG. 27 illustrates exemplary pseudocode for the execution of a TILEMOVE instruction;

FIGS. 28(A)-(C) illustrate an exemplary instruction format;

FIG. 29 is a block diagram of a register architecture according to one embodiment of the invention;

FIGS. 30A-B illustrate the in-order pipeline and in-order core;

DETAILED DESCRIPTION

Figure 1:
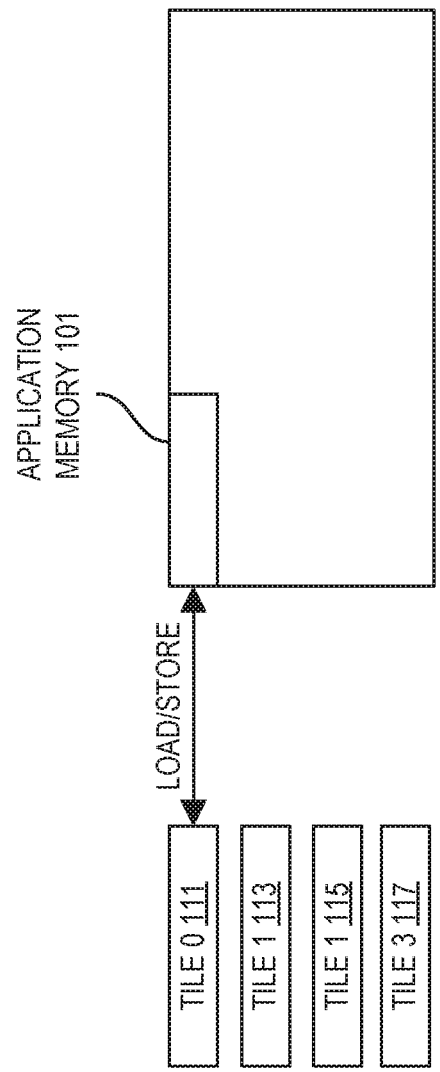
FIG. 1 illustrates an embodiment of configured tiles.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

I. High-Level Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are referred to as tiles. Note that a matrix may be smaller than a tile (use less than all of a tile), or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transpose, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating point, double precision floating point, integer, etc.) may be supported.

A. Exemplary Usage of Configured Tiles

FIG. 1 illustrates an embodiment of configured tiles. As shown, there are four tiles 111, 113, 115, and 117 that are loaded from application memory 101. In this example, tiles T0 111 and T1 113 have M rows and N columns with 4 element bytes (e.g., single precision data). Tiles T2 115 and T3 117 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

Tile Max Rows=Architected Storage/(The Number of Palette Names*The Number of Bytes per row)

As such, an application can be written such that a fixed usage of names will be able to take advantage of different storage sizes across implementations.

Configuration of tiles is done using a tile configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

B. Exemplary Tile Storage Types

Figure 2:
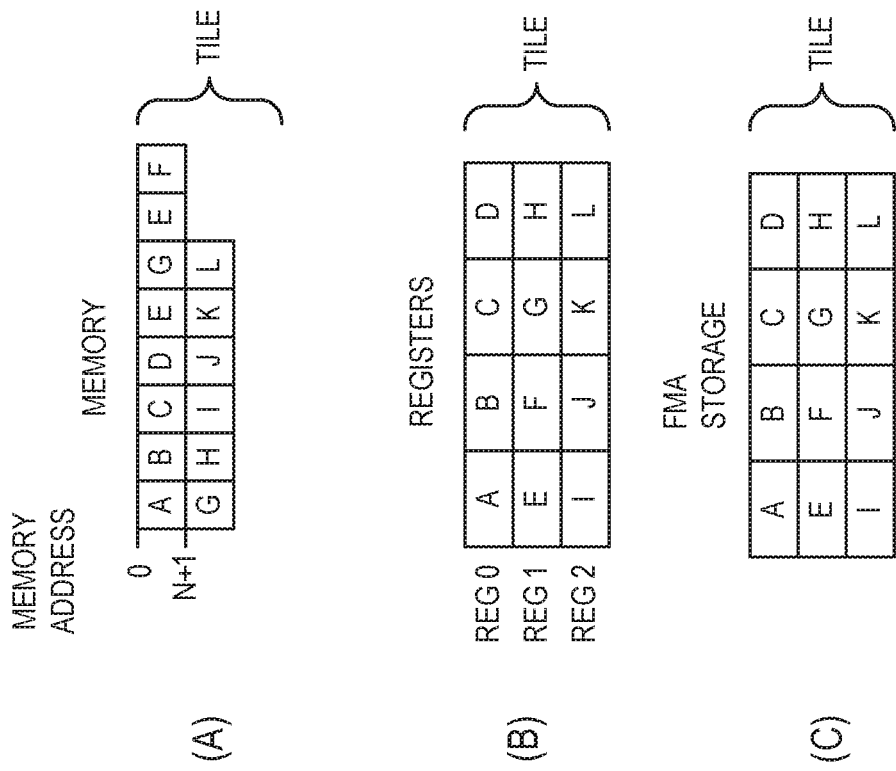
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64 byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64 byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating point exceptions, with the masking of the exceptions controlled by a control and/or status register.

To support restarting instructions after these events, the instructions store information in the start registers detailed below.

II. Matrix (Tile) Operation Systems

A. Exemplary Hardware Support

Figure 3:
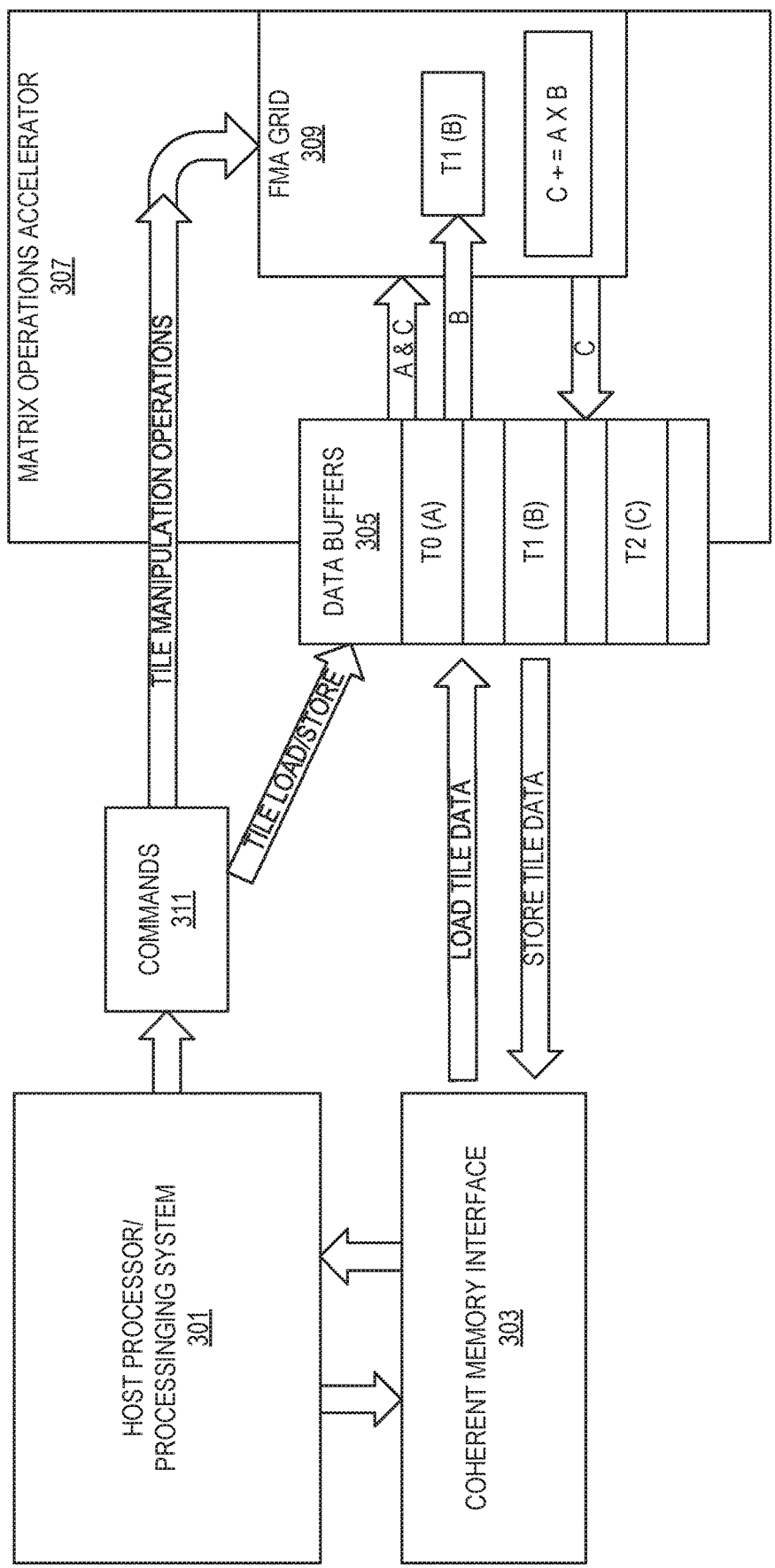
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
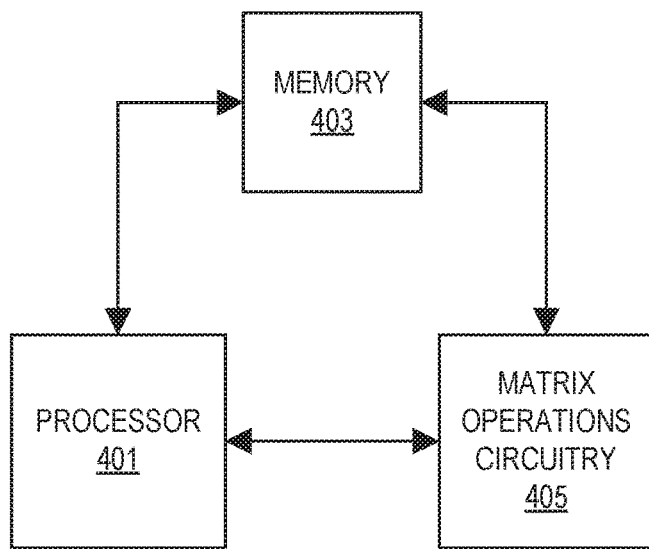
FIGS. 4 and 5 show different embodiments of how memory is shared using a matrix operations accelerator.
Figure 5:
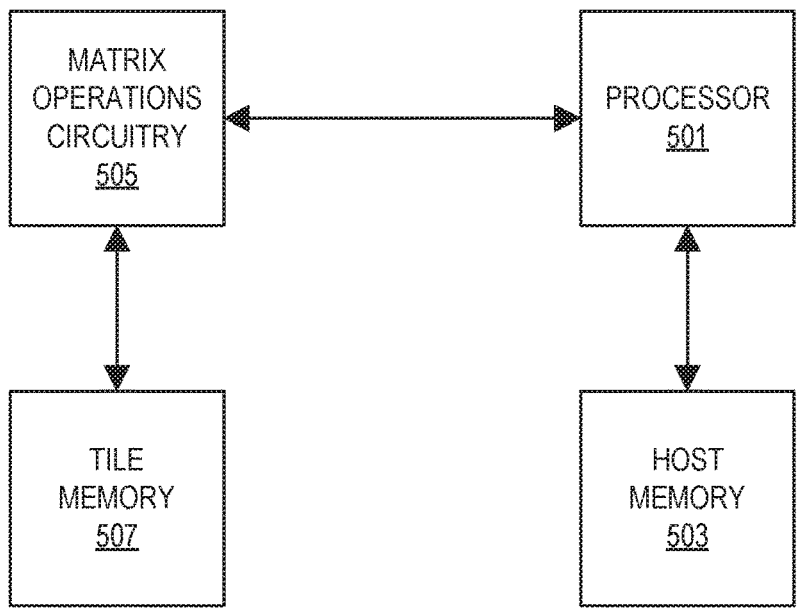

In this example, a coherent memory interface 303 is coupled to the host processor/processing system 301 and matrix operations accelerator 405 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory, but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

The matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset are stored in the FMA grid 309. As shown, T1 is housed and T0 and T2 are not. Note that A, B, and C refer to the matrices of these tiles which may or may not take up the entire space of the tile.

Figure 6:
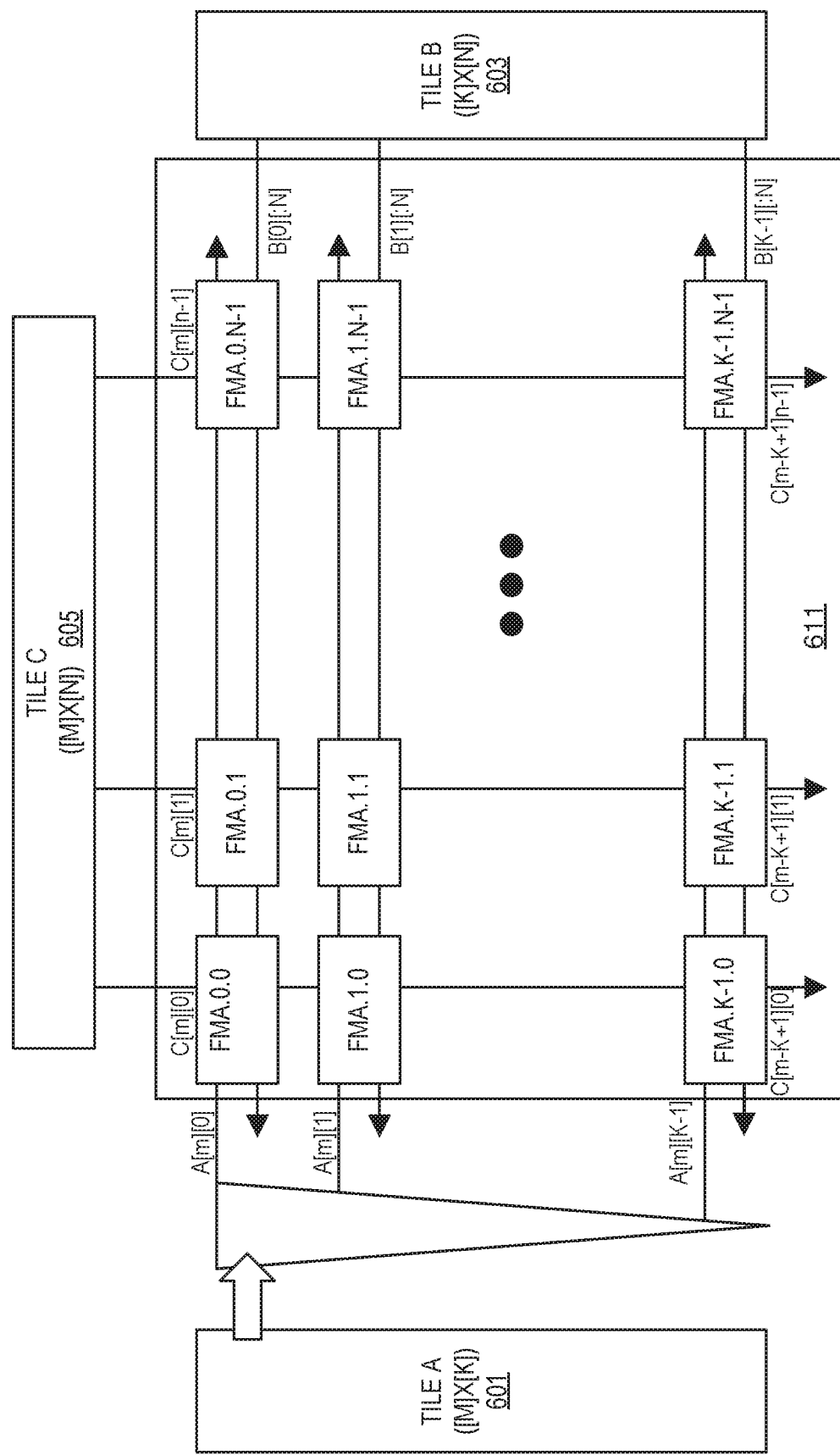
FIG. 6 illustrates an embodiment of matrix multiply accumulate operation using tiles ("TMMA")

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transposed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
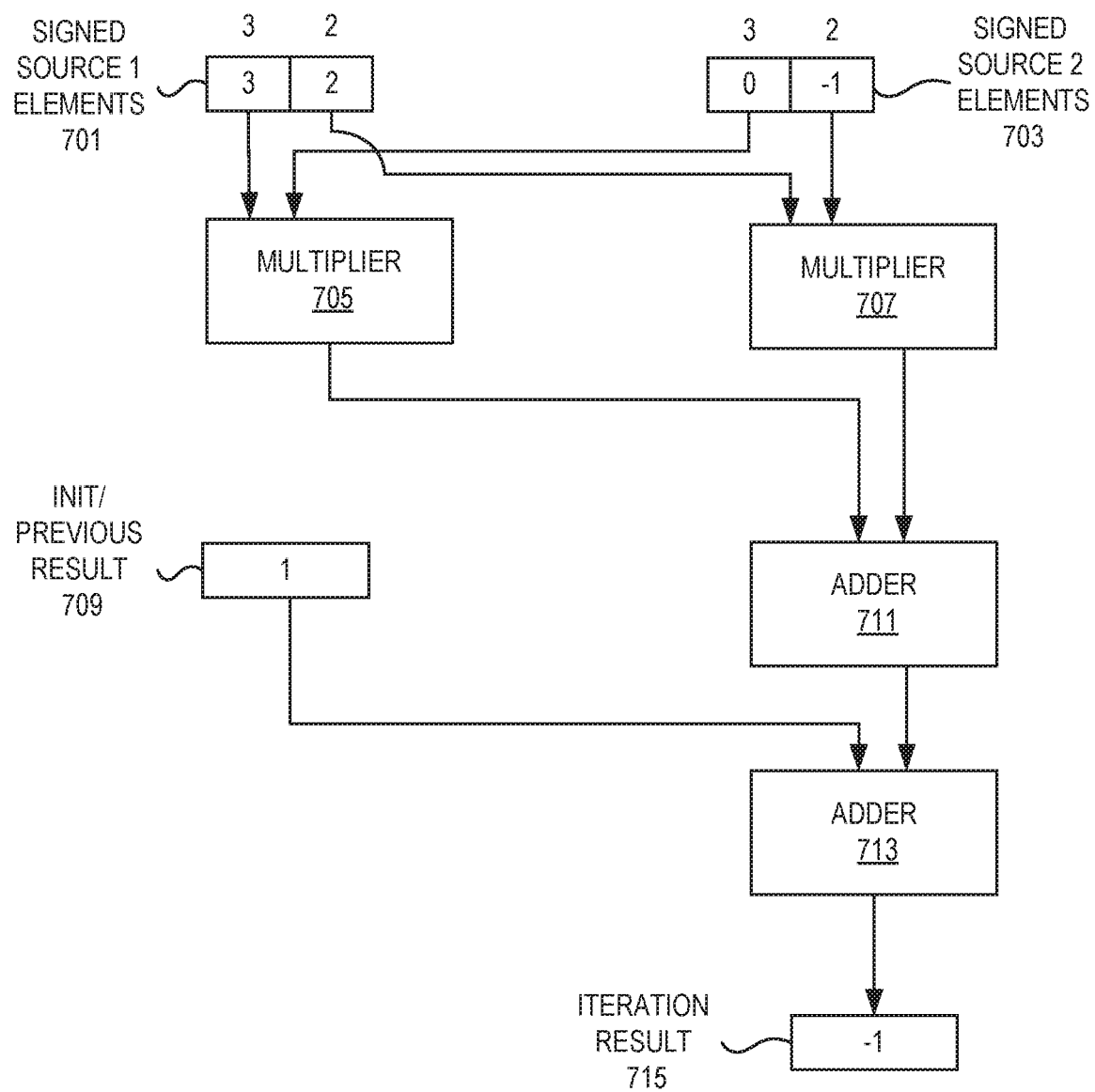
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating point) while the third signed source 709 could have 64-bit packed data elements (e.g., double precision floating point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709, or passed on to the next iteration, if there is one. In some embodiments, a writemask is applied to this storage such that if a corresponding writemask (bit) is set, the storage happens, and, if not set, the storage does not happen.

Figure 8:
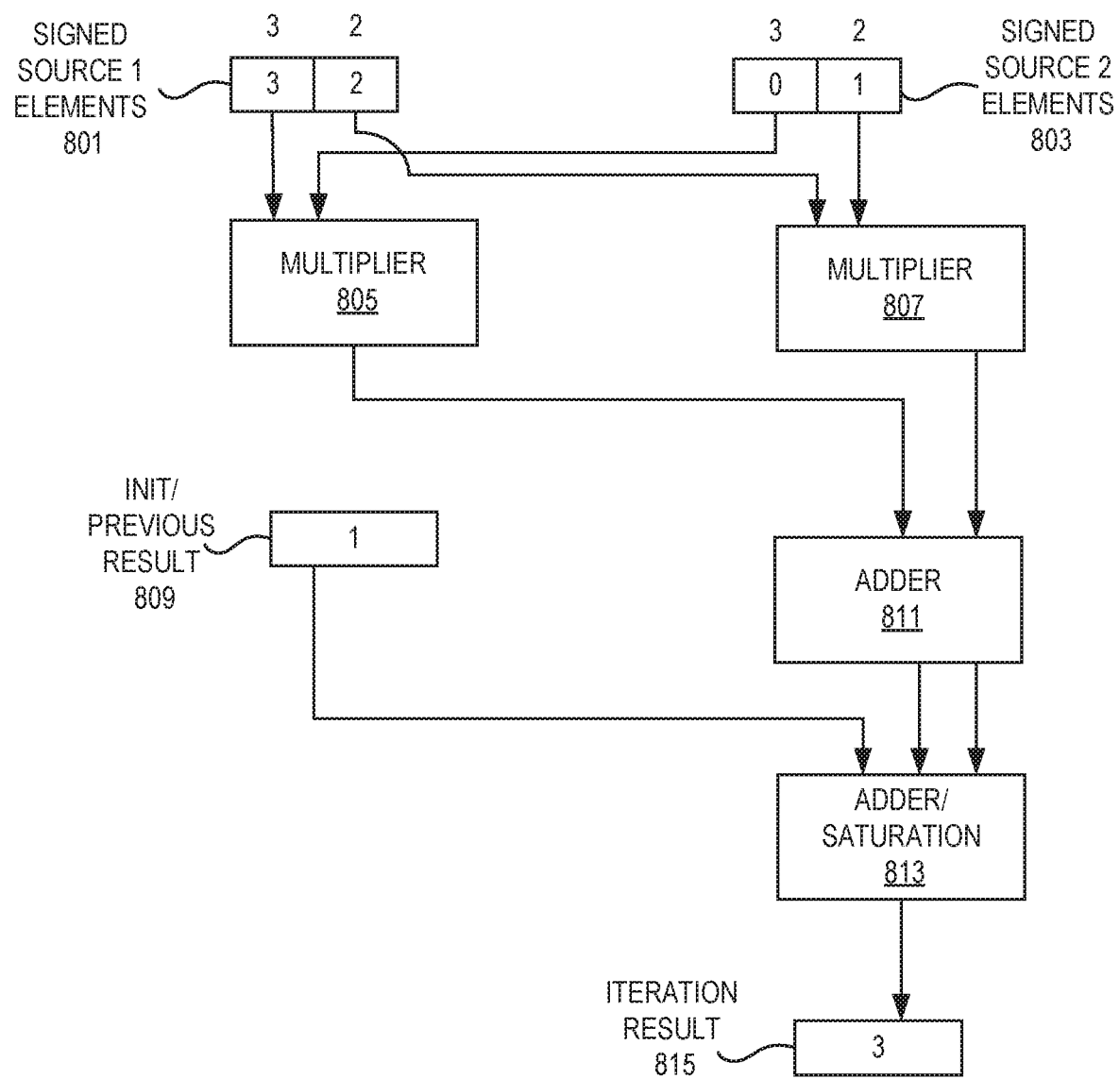
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 811.

Addition/saturation (accumulator) circuitry 811 preserves a sign of an operand when the addition results in a value that is too big. In particular, saturation evaluation occurs on the infinite precision result between the multi-way-add and the write to the destination or next iteration. When the accumulator 811 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1s). Signed saturation means a value is limited to the be in the range between a minimum negative number and a max positive number for that element width (for bytes for example, the range is from −128 (=−2^7) to 127(=2^7−1)).

The result of the addition and saturation check is stored into the signed result 815 in a packed data element position that corresponds to the packed data element position used from the signed third source 809, or passed on to the next iteration if there is one. In some embodiments, a writemask is applied to this storage such that if a corresponding writemask (bit) is set, the storage happens, and, if not set, the storage does not happen.

Figure 9:
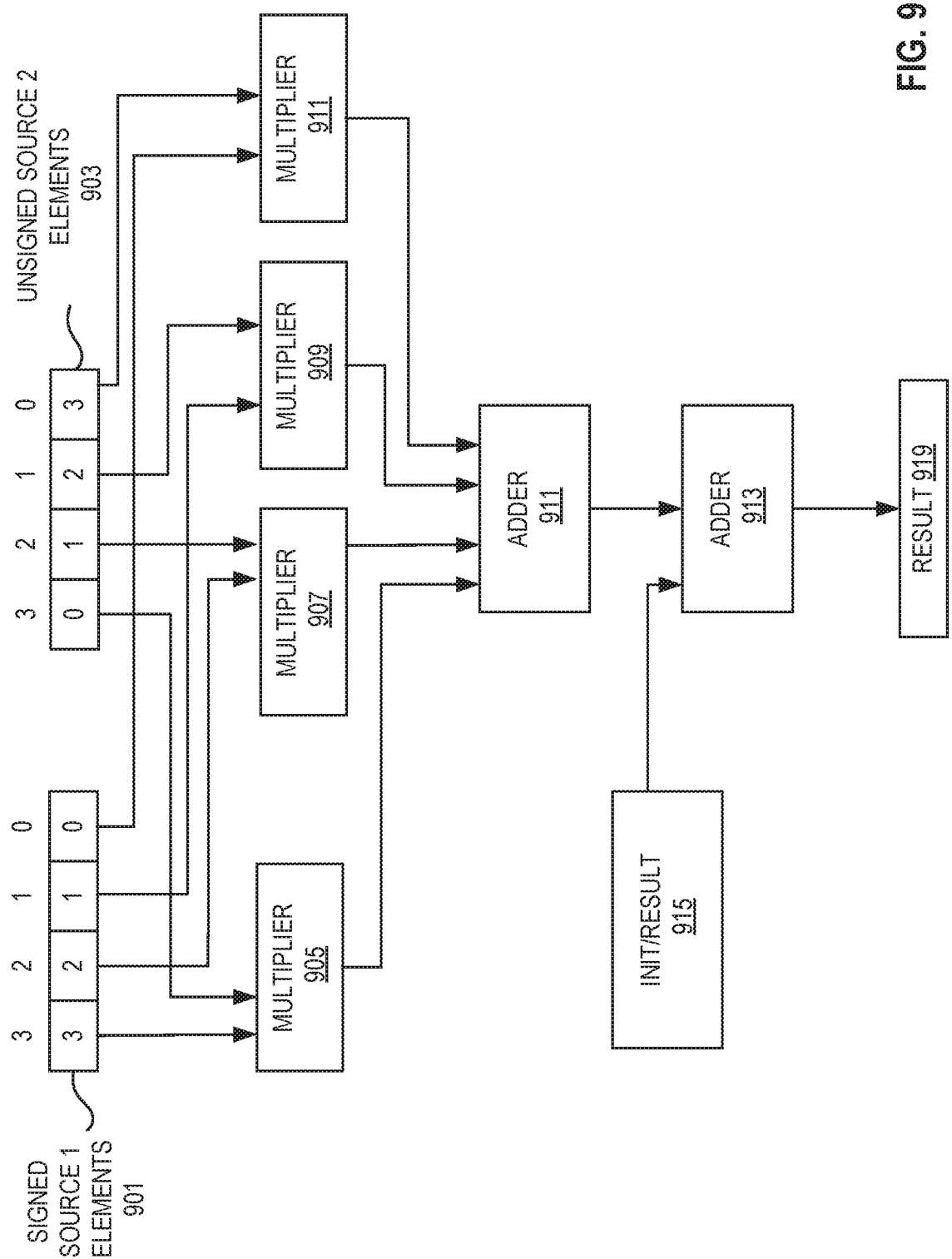
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 907, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 911.

The result of the addition of the results of the multiplications is added to the data from most significant packed data element position of the signed source 3 915 (using a different adder 913 or the same adder 911).

Finally, the result 919 of the second addition is either stored into the signed destination in a packed data element position that corresponds to the packed data element position used from the signed third source 915, or passed to the next iteration. In some embodiments, a writemask is applied to this storage such that if a corresponding writemask (bit) is set, the storage happens, and, if not set, the storage does not happen.

Figure 10:
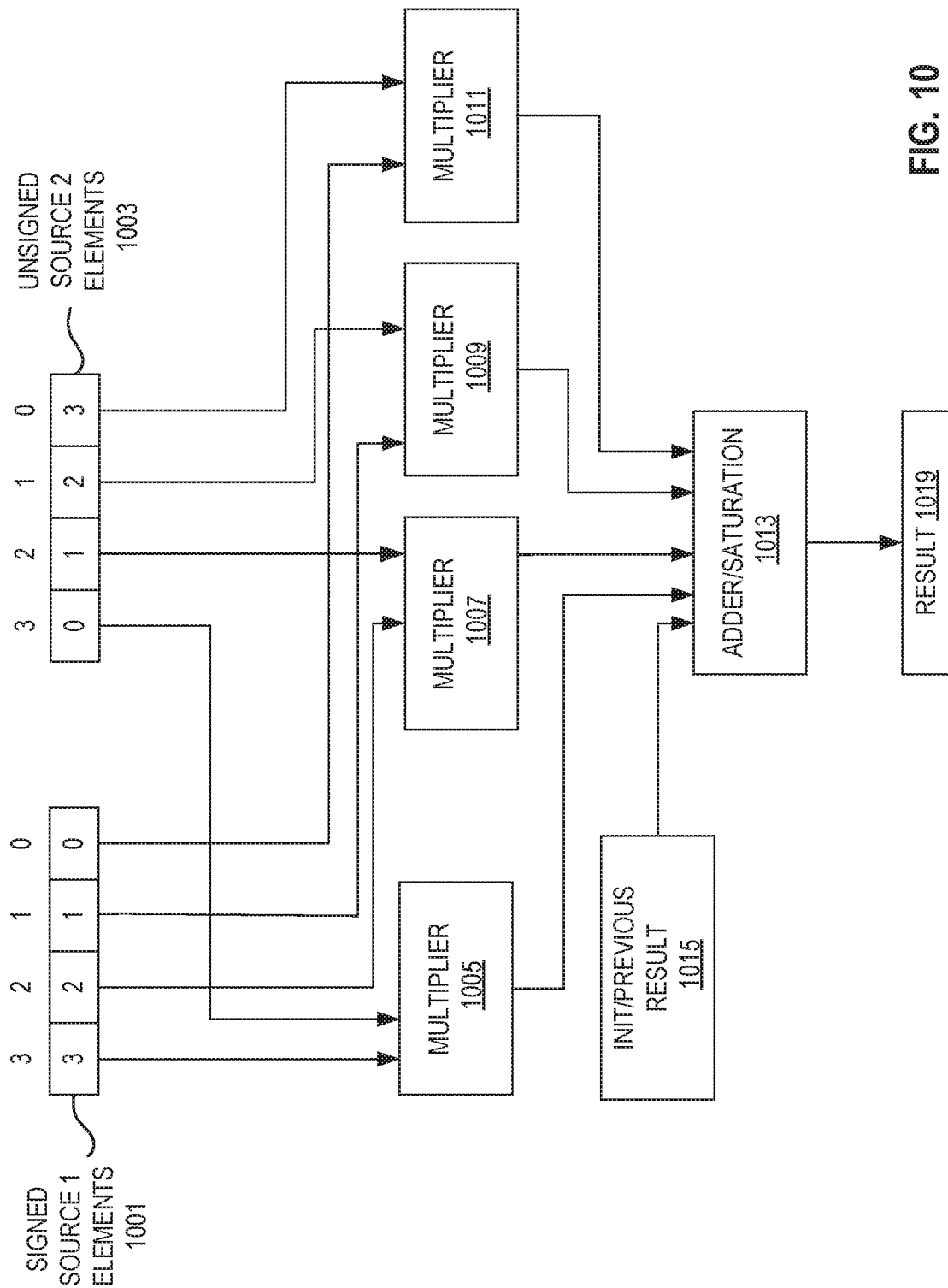
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 1001) and a second unsigned source (source 2 1003) each have four packed data elements. Each of these packed data elements stores data such as floating point or integer data. A third signed source (initial or previous result 1015) has a packed data element of which stores signed data. The sizes of the first and second sources 1001 and 1003 are a quarter of the third signed source 1015. For example, the first and second sources 1001 and 1003 could have 16-bit packed data elements (e.g., word) and the third signed source 1015 could have 64-bit packed data elements (e.g., double precision floating point or 64-bit integer).

In this illustration, the four most significant packed data element positions of the first and second sources 1001 and 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first and second sources 1001 and 1003 are multiplied using a multiplier circuit 1007, data from second most significant packed data element positions of the first and second sources 1001 and 1003 are multiplied using a multiplier circuit 1007, data from third most significant packed data element positions of the first and second sources 1001 and 1003 are multiplied using a multiplier circuit 1009, and data from the least significant packed data element positions of the first and second sources 1001 and 1003 are multiplied using a multiplier circuit 1011. In some embodiments, the signed packed data elements of the first source 1001 are sign extended and the unsigned packed data elements of the second source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of the signed third source 1015. The result of the addition of the results of the multiplications is added to the data from most significant packed data element position of the signed source 3 1015 using addition/saturation circuitry 1013.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from the signed third source 1015, or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
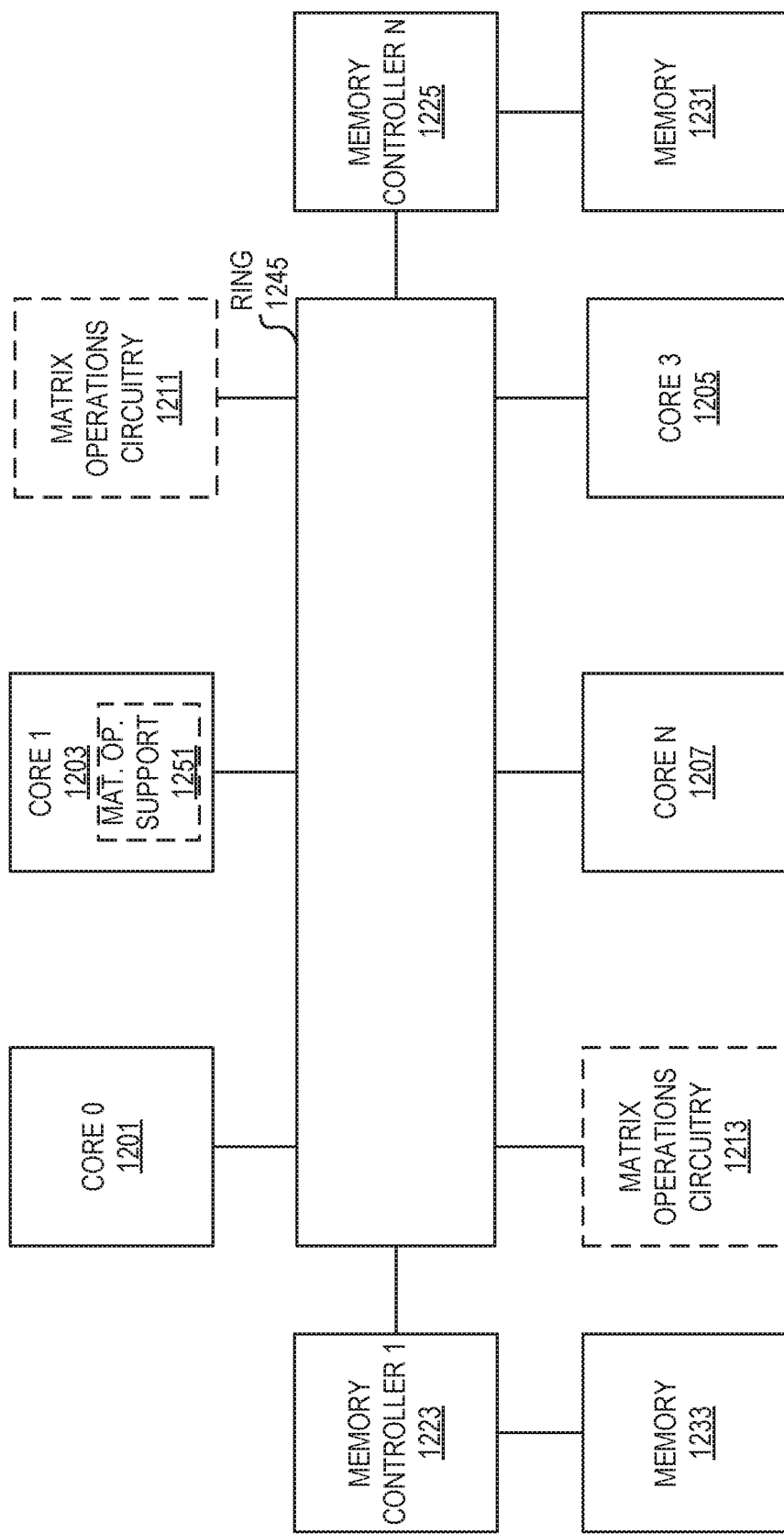
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, a plurality of entities are coupled with a ring interconnect 1245.

A plurality of cores 1201, 1203, 1205, and 1207 provide non-tile based instruction support. In some embodiments, matrix operations circuitry is provided in a core 1203, and in other embodiments matrix operations circuitry 1211 and 1213 is accessible on the ring interconnect 1245.

Additionally, one or more memory controllers 1223-1225 are provided to communicate with memory 1233 and 1231 on behalf of the cores and/or matrix operations circuitry.

Figure 13:
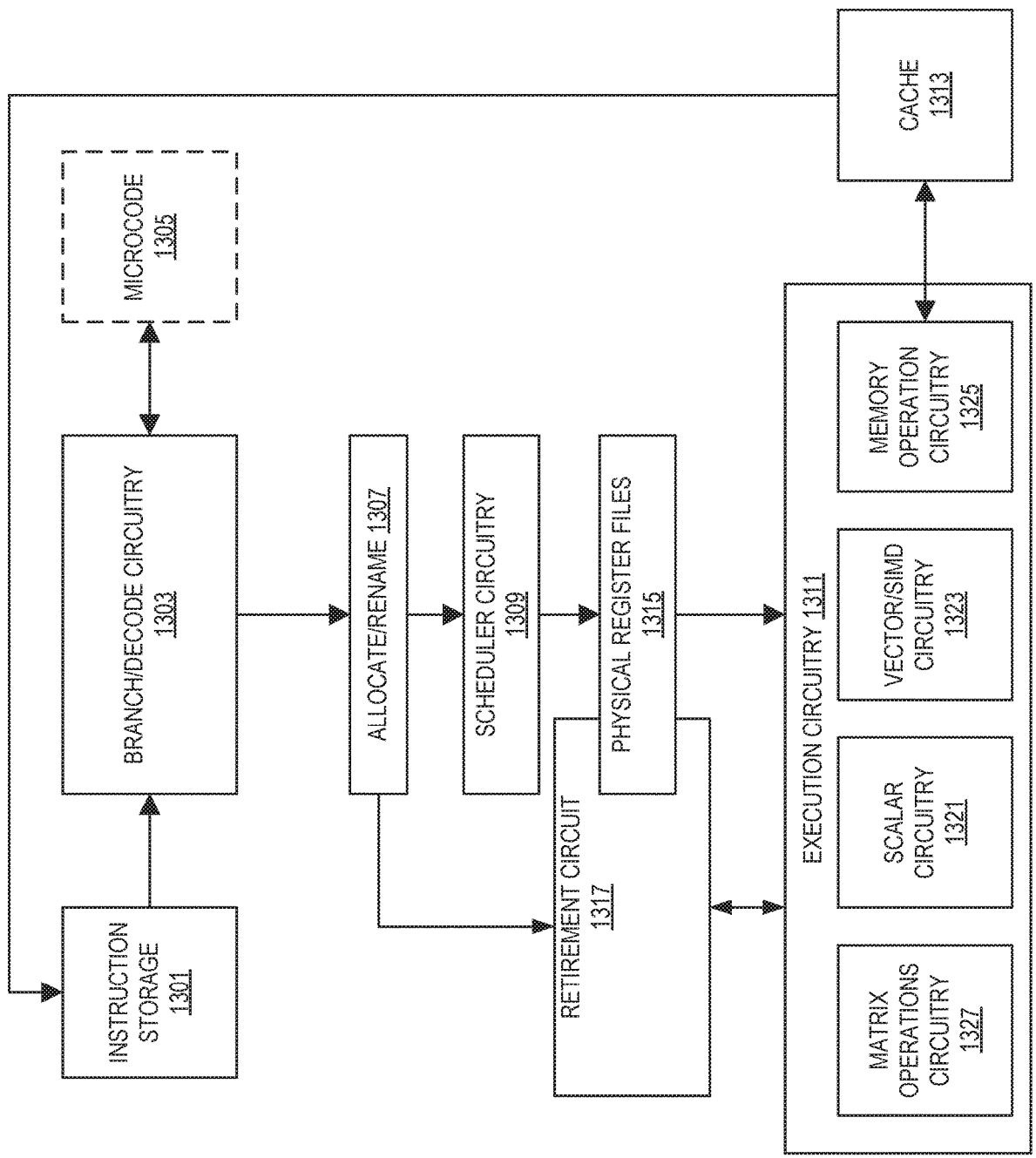
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to a rename/allocator circuitry 1307 which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler unit(s) scheduler circuitry 1309 is coupled to, or includes, physical register file(s) 1315. Each of the physical register file(s) 1315 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuit(s) 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 a set of one or more execution circuits 1321, 1323, and 1327 and a set of one or more memory access circuits 1325. The execution circuits 1321, 1323, and 1327 perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the rename/allocator circuitry 1307 performs an allocation stage and renaming stage; 4) the scheduler circuitry 1309 performs a schedule stage; 5) physical register file(s) (coupled to, or included in, the scheduler circuitry 1307 and rename/allocate circuitry 1307 and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
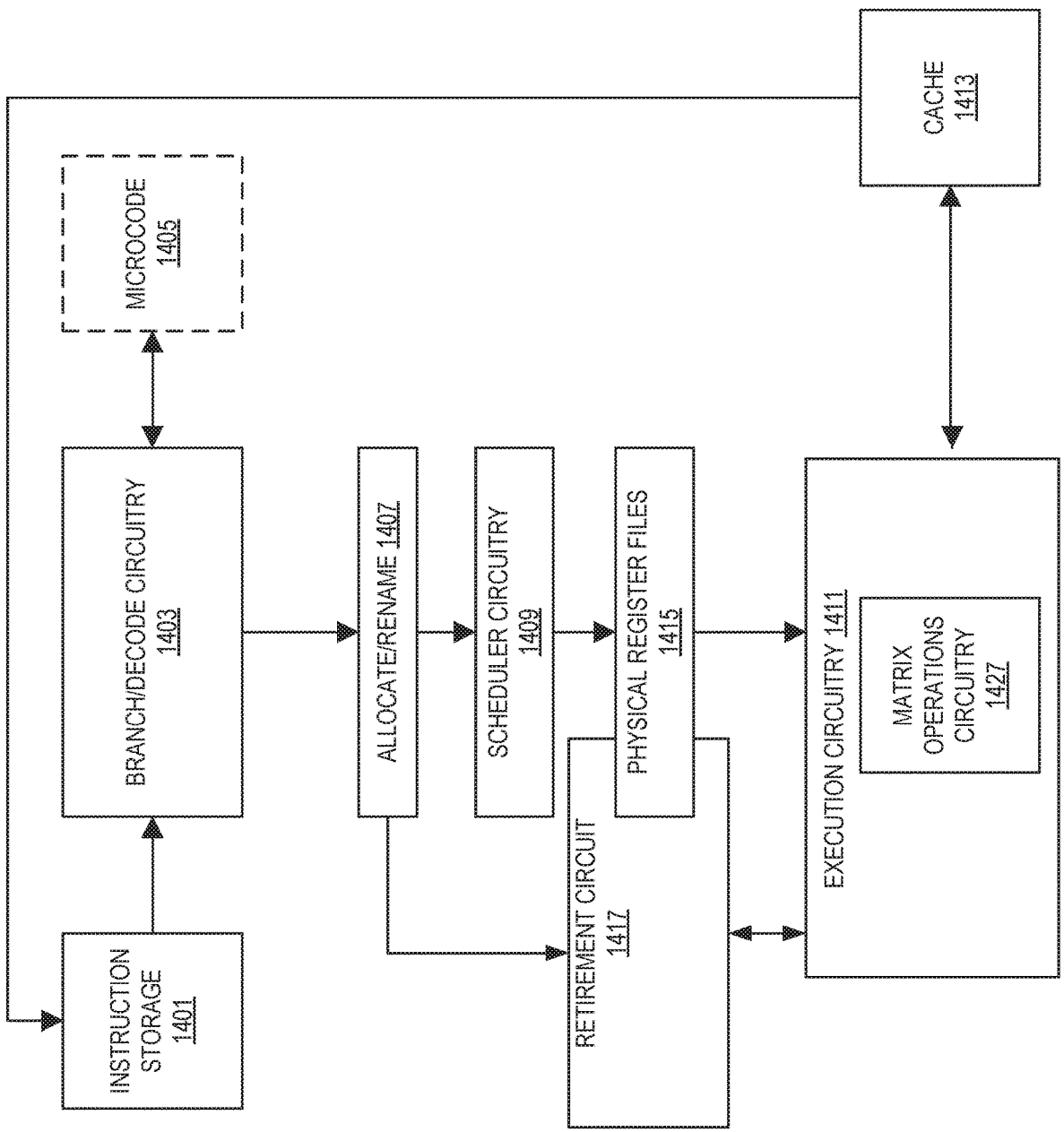
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to a rename/allocator circuitry 1407 which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating point, packed integer, packed floating point, vector integer, vector floating point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuit(s) 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425. The execution circuits 1427 perform matrix (tile) operations detailed herein.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the rename/allocator circuitry 1407 performs an allocation stage and renaming stage; 4) the scheduler circuitry 1409 performs a schedule stage; 5) physical register file(s) (coupled to, or included in, the scheduler circuitry 1407 and rename/allocate circuitry 1407 and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

B. Layout

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that $A^T * B^T = (BA)^T$, where superscript T means transpose. Reading column major data as row major data results in the matrix looking like the transpose matrix.

In some embodiments, row-major semantics are utilized in hardware, and column major data is to swap the operand order with the result being transposes of matrix, but for subsequent column-major reads from memory it is the correct, non-transposed matrix.

For example, if there are two column-major matrices to multiply:

$$\begin{matrix} ab \\ cd \\ ef \\ (3\times 2) \end{matrix} * \begin{matrix} gik \\ hjl \\ (2\times 3) \end{matrix} = \begin{matrix} ag+bh & ai+bj & ak+bl \\ cg+dh & ci+dj & ck+dl \\ eg+fh & ei+fj & ek+fl \\ (3\times 3) \end{matrix}$$

The input matrices would be stored in linear memory (column-major) as:

a c e b d f
and
g h i j k l.

Reading those matrices as row-major with dimensions 2×3 and 3×2, they would appear as:

$$\begin{matrix} a c e \\ b d f \end{matrix} \quad \text{and} \quad \begin{matrix} g h \\ i j \\ k l \end{matrix}$$

Swapping the order and matrix multiplying:

$$\begin{matrix} g h \\ i j \\ k l \end{matrix} * \begin{matrix} a c e \\ b d f \end{matrix} = \begin{matrix} ag+bh & cg+dh & eg+fh \\ ai+bj & ci+dj & ei+fj \\ ak+bl & ck+dl & ek+fl \end{matrix}$$

the transpose matrix is out and can then be stored in in row-major order:

| ag + bh | cg + dh | eg + fh | ai + bj | ci + dj | ei + fj | ak + bl | ck + dl | ek + fl | and used in subsequent column major computations, it is the correct un-transposed matrix:

| ag + bh | ai + bj | ak + bl |
| cg + dh | ci + dj | ck + dl |
| eg + fh | ei + fj | ek + fl |

III. Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the A matrix 1603 (tmm2) is re-used twice as it multiplied by two tiles from the B matrix 1605. Pointers to load a new A tile and two new B tiles from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Example 1 An apparatus comprising: matrix operations circuitry to execute one or more decoded matrix operation instructions on data stored in two-dimensional data structures; and storage to store the two-dimensional data structures.

Example 2 The apparatus of example 1, wherein the storage is a plurality of packed data registers and the two-dimensional data structures are overlaid on these registers.

Example 3 The apparatus of example 1, wherein the storage is a plurality of packed data registers and memory, and the two-dimensional data structures are overlaid on these registers and memory.

Example 4 The apparatus of any of examples 1-3, wherein the matrix operations circuitry is a plurality of chained fused multiply accumulate circuits.

Example 5 The apparatus of example 4, wherein each of the chained fused multiply accumulate circuits is to include storage for a portion of a two-dimensional data structure that the fused multiply accumulate circuit is to operate on.

Example 6 The apparatus of any of examples 1-5, wherein matrix operations circuitry supports element matrix multiply, subtract, and add instructions.

Example 7 The apparatus of any of examples 1-6, wherein matrix operations circuitry supports dot product and multiply accumulate operations.

Example 8 The apparatus of any of examples 1-7, wherein matrix operations circuitry supports matrix transpose and diagonal operations.

Example 9 A system comprising: a host processor; a matrix operations accelerator coupled to the host processor, wherein the matrix operations accelerator is to perform matrix operations on two-dimensional data structures using a computational grid based on commands received from the host processor.

Example 10 The system of example 9, wherein the matrix operations accelerator further comprises a plurality of data buffers to buffer matrix data in two-dimensional data structures.

Example 11 The system of any of examples 9-10, wherein the computational grid is to house at least one of the buffered matrix data from the plurality of data buffers during a matrix manipulation operation.

Example 12 The system of any of examples 9-11, wherein the data buffers are a plurality of registers.

Example 13 The system of example 12, wherein the registers are a plurality of packed data registers and the two-dimensional data structures are overlaid on these registers.

Example 14 The system of example 12, wherein the storage is a plurality of packed data registers and memory, and the two-dimensional data structures are overlaid on these registers and the memory.

Example 15 The system of any of examples 9-14, wherein the matrix operations circuitry is a plurality of chained fused multiply add circuits.

Example 16 The system of example 15, wherein each of the chained fused multiply add circuits is to include storage for a portion of a two-dimensional data structure that the fused multiply add circuit is to operate on.

Example 17 The system of any of examples 9-15, further comprising a coherent memory interface coupled to the matrix operations accelerator and host processor to provide access to shared memory between the host processor and matrix operations accelerator.

Figure 17:
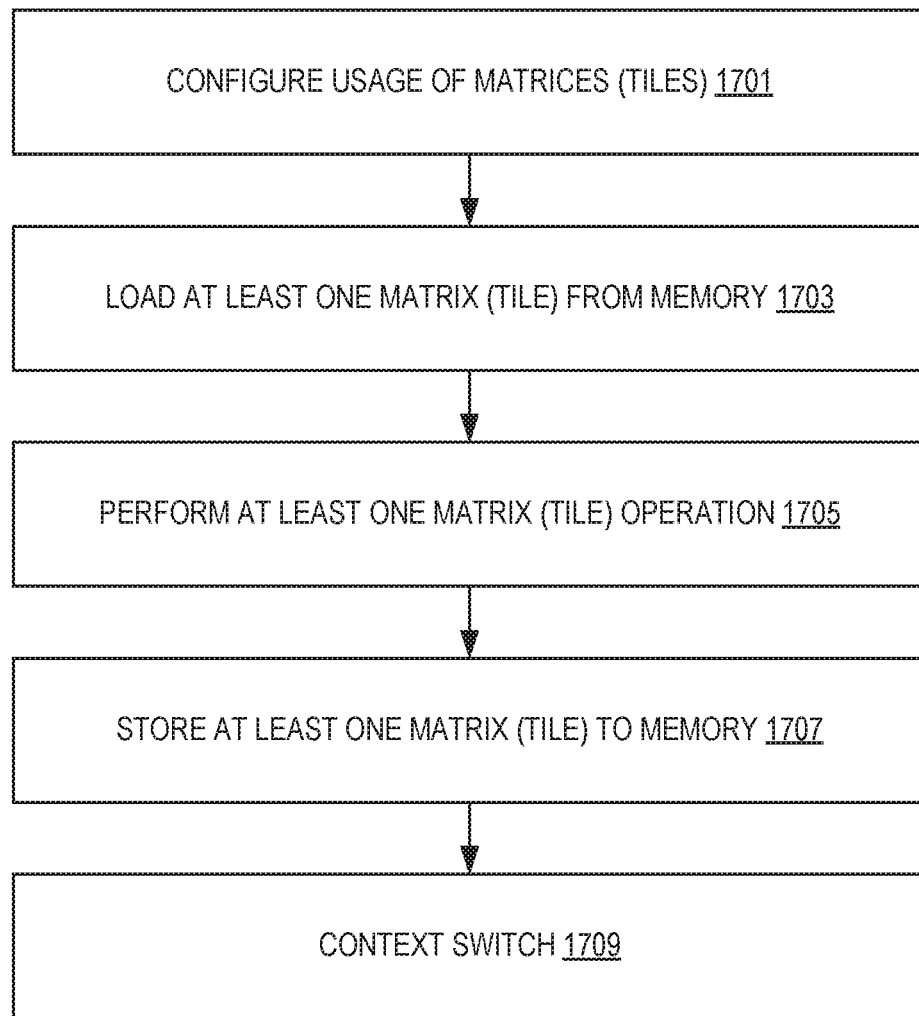
FIG. 17 illustrates an embodiment a method of usage of matrices (tiles)

FIG. 17 illustrates an embodiment of usage of matrices (tiles). At 1701, tile usage is configured. For example, a TILECONFIG instruction is executed to configure tile usage including setting a numbers of rows and columns per tile. Typically, at least one matrix (tile) is loaded from memory at 1703.

IV. Exemplary Instructions

A. Tile Configuration

As discussed above, tile usage typically needs to be configured prior to use. For example, full usage of all rows and columns may not be needed. Not only does not configuring these rows and columns save power in some embodiments, but the configuration may be used to determine if an operation will generate an error. For example, a matrix multiplication of the form (N×M)*(L*N) will typically not work if M and L are not the same.

Detailed herein are embodiments of a matrix (tile) configuration ("TILECONFIG") instruction and its execution. Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a configuration to be retrieved from memory and applied to matrix (tile) settings within a matrix accelerator.

i. Exemplary Execution

Figure 18:
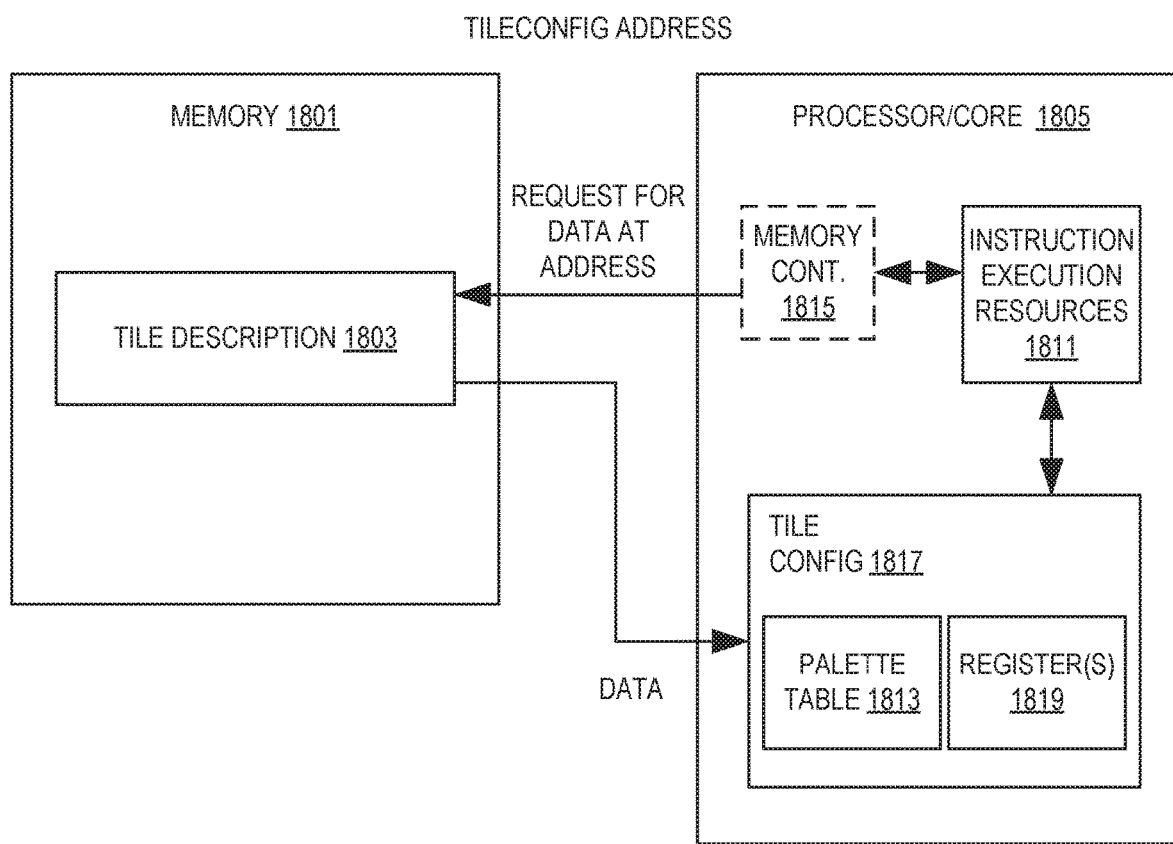
FIG. 18 illustrates an exemplary execution of a TILE-CONFIG instruction.

FIG. 18 illustrates an exemplary execution of a TILECONFIG instruction. The TILECONFIG instruction format includes fields for an opcode and a memory address.

As illustrated, the TILECONFIG instruction uses the address as a pointer to a memory 1801 location containing the description of the matrices (tiles) to be supported 1803.

Execution circuitry 1811 of a processor/core 1805 performs the TILECONFIG by retrieving the description 1803 from memory 1801 via a memory controller 1815, configuring tiles for a palette (setting the number of rows and columns) in a tile configuration 1817, and marking that matrix support is in use. In particular, instruction execution resources 1811 are configured to use tiles as specified by setting tile configurations 1817. The instruction execution resources may also include a machine specific register or configuration register to indicate tile usage.

Tile configurations 1817 are set to indicate parameters per tile as indicated by the tile description 1803 via the execution of the TILECONFIG instruction. The set parameters are the number of rows and columns per tile. Additional values such as in-use and start values are also set. The tile configurations 1817 utilize one or more registers 1819 to store tile usage and configuration information.

ii. Exemplary Tile Storage

Figure 19A:
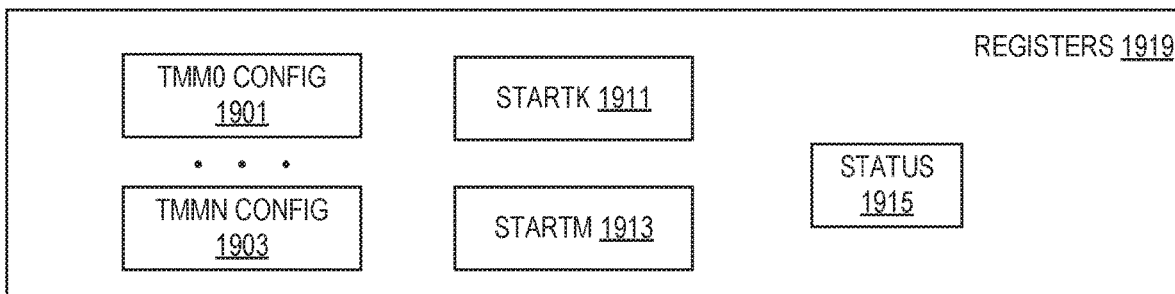
FIGS. 19(A)-(D) illustrate examples of register(s)

FIGS. 19(A)-(D) illustrate examples of register(s) 1819. FIG. 19(A) illustrates a plurality of registers 1819. As shown each tile (TMM0 1901 . . . TMMN 1903) has a separate register with each register storing a row and column size for that particular tile. StartK and StartM are stored in separate registers 1911 and 1913. One or more status registers 1915 are set (e.g., TILES_CONFIGURED=1) to indicate tiles are configured for use.

Figure 19B:
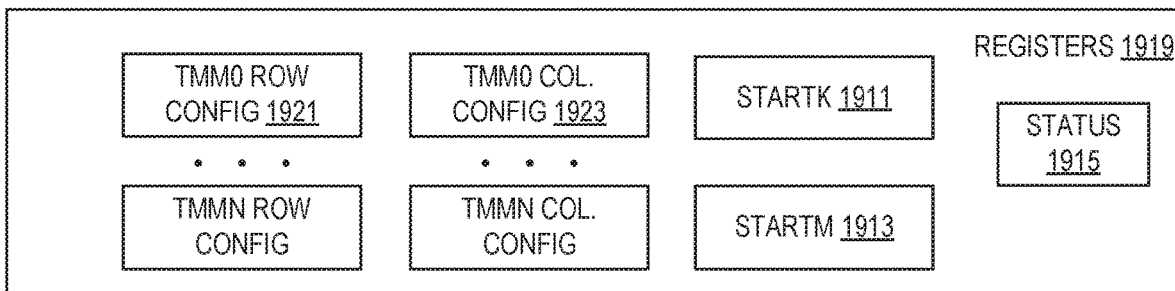

FIG. 19(B) illustrates a plurality of registers 1819. As shown each tile has separate registers for its rows and columns. For example, TMM0 rows configuration 1921, TMM0 columns configuration 1923, StartK and StartM are stored in separate registers '1911 and 1913. One or more status registers 1915 are set (e.g., TILES_CONFIGURED=1) to indicate tiles are configured for use.

Figure 19C:
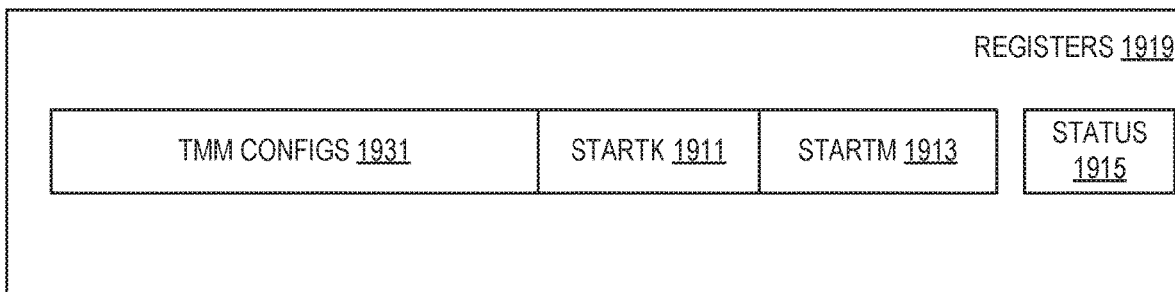

FIG. 19(C) illustrates a single register 1819. As shown, this register stores tile configurations (rows and columns per tile) 1931, StartK 1933, and StartM 1933 are stored in single register as packed data registers. One or more status registers 1915 are set (e.g., TILES_CONFIGURED=1) to indicate tiles are configured for use.

Figure 19D:
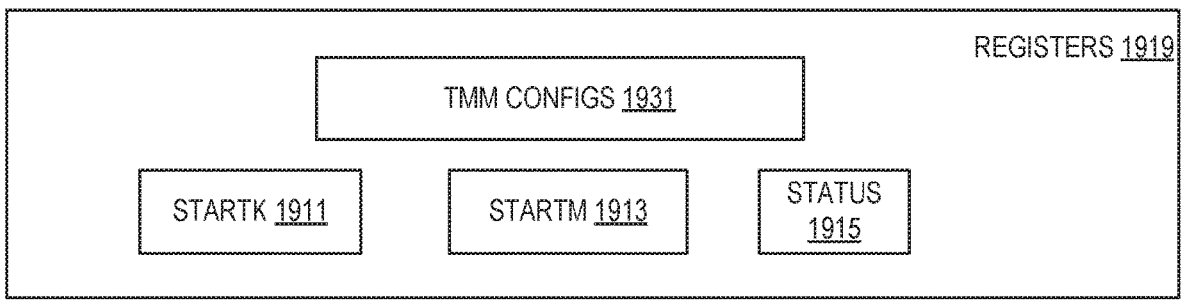

FIG. 19(D) illustrates a plurality of registers 1819. As shown, a single register stores tile configurations (rows and columns per tile) 1931. StartK and StartM are stored in separate registers 1911 and 1913. One or more status registers 1915 are set (e.g., TILES_CONFIGURED=1) to indicate tiles are configured for use.

Other combinations are contemplated such as combining the start registers into a single register where they are shown separately, etc.

iii. Exemplary Stored Matrix (Tile) Description

FIG. 20 illustrates an embodiment of a description of the matrices (tiles) to be supported. In this example, each field is a byte. In byte[0], a palette ID 2001 is stored. The palette ID is used to index a palette table 1813 which stores, per palette ID, a number of bytes in a tile, and bytes per row of the tiles that are associated with this ID as defined by the configuration. Bytes 1-7 are reserved and are typically zero.

Bytes 8-9 store a value for a "startM" register 2003 and bytes 10-11 store a value for a "startK" register 2005. To support restarting instructions after these events, the instructions store information these registers. The startM indicates a row that should be used for restart. The startK indicates a position in the inner-product for relevant operations. The position in the row (the column) is not needed. Two-dimensional operations like the element-wise addition/subtraction/multiplication only use startM. Three-dimensional operations use values from both startM and startK. Typically, operations that only require startM will zero startK when writing startM.

Any time an interrupted tile instruction is not restarted, in some embodiments, it is the responsibility of software to zero the startM and startK values. For example, unmasked floating point exception handlers might decide to finish the operation in software and change the program counter value to another instruction, usually the next instruction. In this case the software exception handler must zero the startM and startK values in the exception frame presented to it by the operating system before resuming the program. The operating system will subsequently reload those values.

Bytes 16-17 store the number of rows 2013 and columns 2015 for tile 0, bytes 18-19 store the number of rows and columns for tile 1, etc. In other words, each 2 byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to the INIT state with 0 rows, 0 columns.

Finally, the configuration in memory typically ends with an ending delineation such as all zeros for several consecutive bytes.

iv. Exemplary Format(s)

An embodiment of a format for a TILECONFIG instruction is TILECONFIG Address. In some embodiments, TILECONFIG is the opcode mnemonic of the instruction.

Address is a pointer to a matrix (tile) description in memory. In some embodiments, the address field is a R/M value (such as 2446).

In embodiments, encodings of the instruction include a scale-index-base (SIB) type memory addressing operand that indirectly identifies multiple indexed destination locations in memory (e.g., field 2450). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

v. Exemplary Method(s) of Execution

Figure 21:
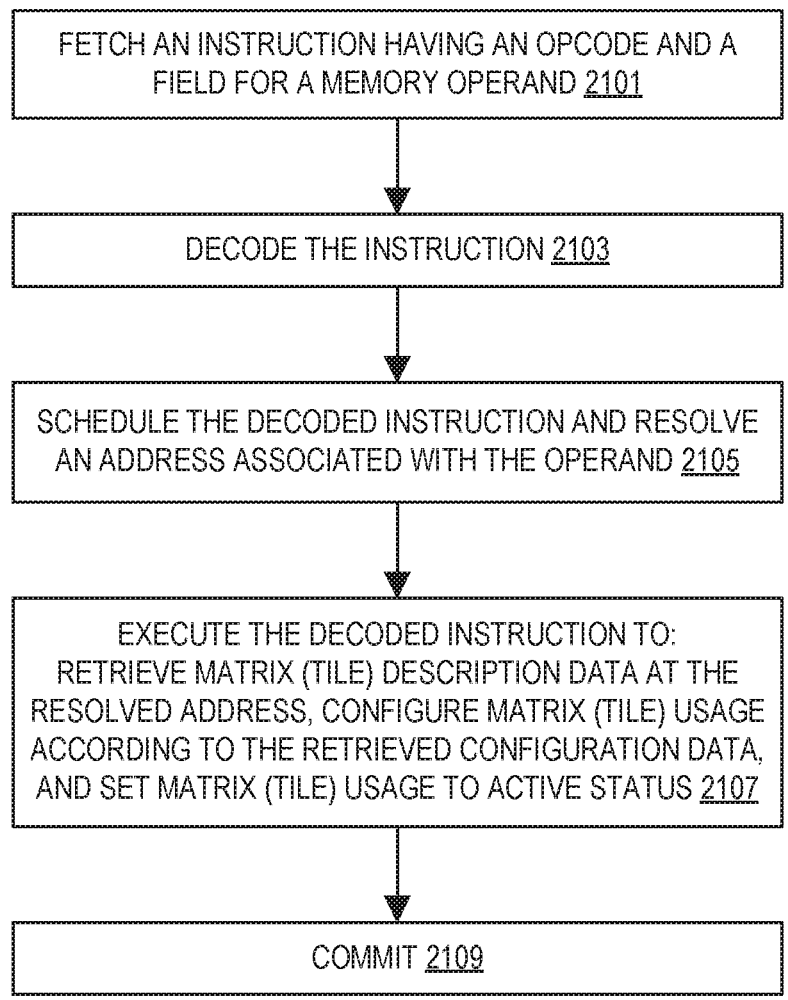
FIG. 21 illustrates an embodiment of method performed by a processor to process a TILECONFIG instruction.

FIG. 21 illustrates an embodiment of method performed by a processor to process a TILECONFIG instruction.

At 2101, an instruction is fetched. For example, a TILECONFIG instruction is fetched. An embodiment of the TILECONFIG instruction includes fields for an opcode and a memory address operand.

The fetched instruction is decoded at 2103. For example, the fetched TILECONFIG instruction is decoded by decode circuitry such as that detailed herein.

A description found at the memory address of the memory address operand is are retrieved at 2105 and the decoded instruction is scheduled (as needed).

At 2107, the decoded instruction is executed by execution circuitry (hardware) such as that detailed herein. For the TILECONFIG instruction, the execution will cause execution circuitry to configure usage of tiles in a tile configuration (setting the number of rows and columns) and marking that matrix (tile) support is in use (active). For example, configuration one or more registers 1819. Tile support usage (e.g., "TILES_CONFIGURED") is typically indicated by setting a bit in a status, control, or machine specific register. In particular, instruction execution resources 1811 are configured to use tiles as specified by the retrieved configuration.

In some embodiments, the instruction is committed or retired at 2109.

Figure 22:
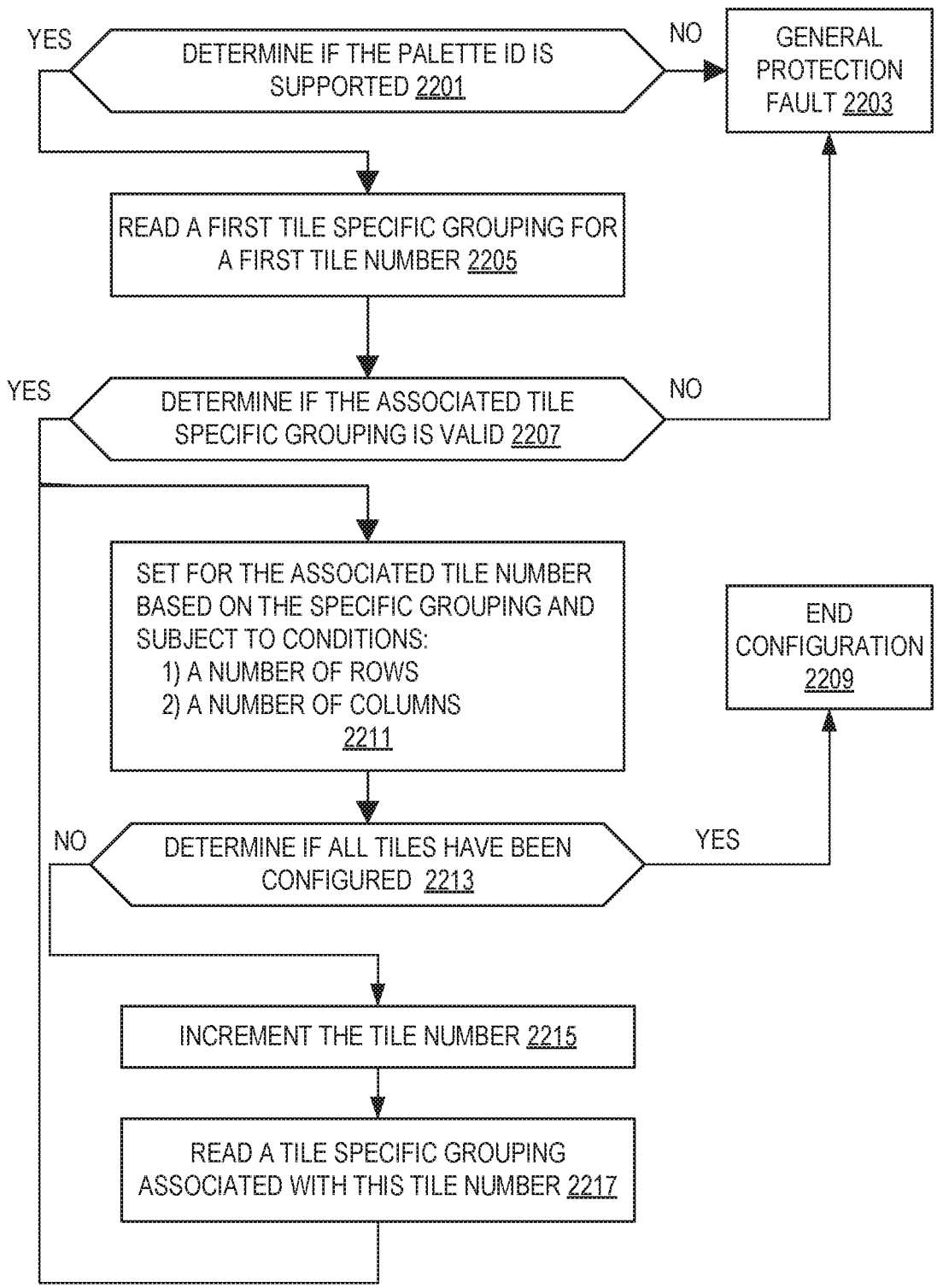
FIG. 22 illustrates a more detailed description of an execution of a TILECONFIG instruction using memory addressing.

FIG. 22 illustrates a more detailed description of an execution of a TILECONFIG instruction using memory addressing. Typically, this is performed by execution circuitry such as that detailed above after the description has been retrieved from memory. While not illustrated, in some embodiments, a check is first performed to determine if tiles are supported. Support is usually found by a CPUID check.

At 2201, a determination of if the palette ID is supported is made. For example, does the CPUID state that this ID is supported? If not, then a general protection fault occurs at 2203.

At 2205, a first tile specific grouping is read. For example, the number of rows and columns for tile 0 (T0) is read.

A determination of if the read grouping is valid is made at 2207. For example, if one the number of rows or columns (not both) is set 0, then the grouping is not valid and the configuration halts and tiles are not considered to be in use at 2203. Invalid groups occur, for example, when one of rows or columns (not both) are zero. Additionally, when a value for the number of rows is greater than the maximum of rows supported (this is found by dividing the tile byte size of the palette ID with the number of bytes per row for the palette ID as found in the palette table) as fault occurs. Another potential fault is when there are more names than supported.

If the read grouping is valid, then the tile associated with the read grouping is configured to use the number of rows and columns specified by the grouping in a tile configuration at 2211. The size of the elements in the tile are set by the palette table entry for the palette ID.

A determination of if all tiles of the retrieved configuration have been configured is made at 2213. For example, have all of the possible tile names been processed? In some embodiments, when the rows and columns for a particular tile are both 0, then all tiles have been processed.

When all tiles have not been configured, at 2215, the tile number is incremented such that the next tile in the configuration will be evaluated.

At 2217, the incremented tile's grouping is read. For example, the number of rows and columns for tile 1 (T1) is read. A determination of if the read grouping is valid is made at 2207, etc.

When all tiles have been configured, then the instruction completes at 2209. The tiles will be marked as being in use for matrix operations, for example, by setting an in-use indicator in a register.

vi. Exemplary Pseudocode

FIG. 23 illustrates exemplary pseudocode for an execution of a TILECONFIG instruction.

B. Tile Move i. EXEMPLARY EXECUTION

Detailed herein are embodiments of a matrix (tile) move ("TILEMOVE") instruction and its execution. A TILEMOVE instruction is an improvement a computer itself as it provides for support to move data from one matrix (tile) to another matrix (tile) with a single instruction. In particular, the execution of the TILEMOVE instruction causes all data from a source matrix (tile) to be stored into a corresponding data element position of a destination matrix (tile). The size of the data values to be stored varies depending on the instruction and tile support. Exemplary sizes included, but are not limited to, 16-bit, 32-bit, 64-bit, 128-bit, 256-bit, etc. In some embodiments, elements of rows of the destination matrix (tile) that do not have corresponding columns in the source matrix (tile) are zeroed.

Figure 24:
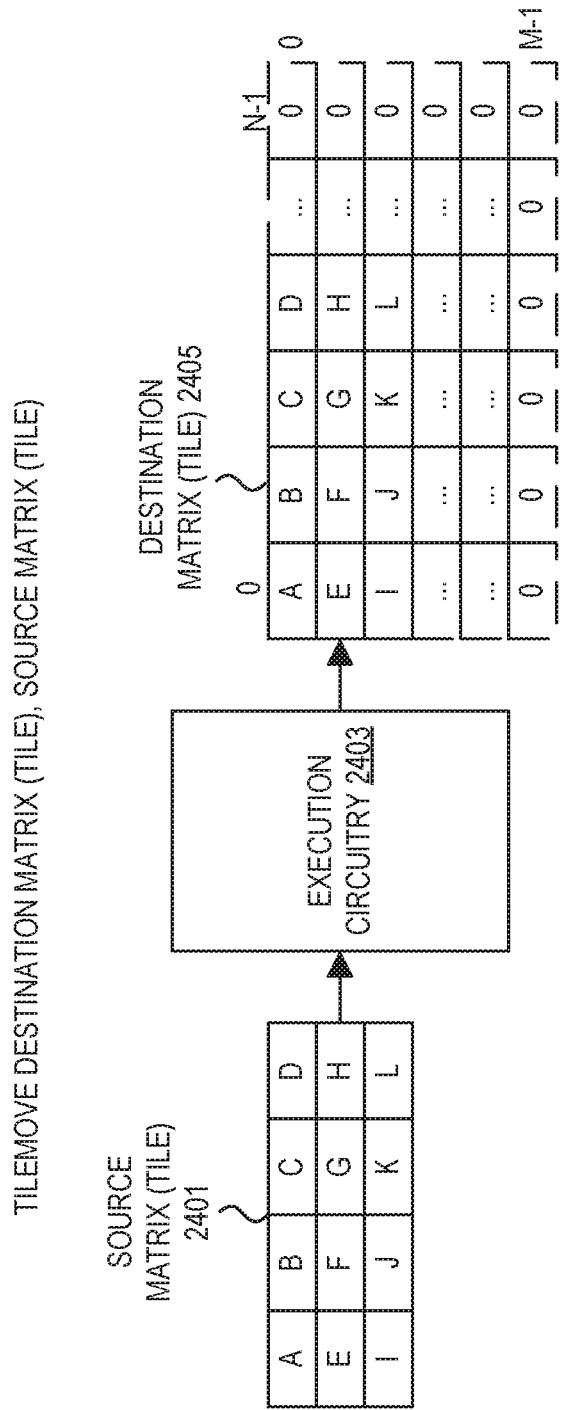
FIG. 24 illustrates an exemplary execution of a TILEMOVE instruction.

FIG. 24 illustrates an exemplary execution of a TILEMOVE instruction. The TILEMOVE instruction format includes fields for an opcode, a source matrix (tile) operand identifier (shown as "SOURCE MATRIX (TILE)"), and a destination matrix (tile) operand identifier (shown as "DESTINATION MATRIX (TILE)").

The source and destination matrix (tile) operand fields represent a source matrix (tile) 2401 and a destination matrix (tile) 2405. As detailed earlier, a matrix (tile) may be stored in a collection of registers, locations in memory (e.g., as strided rows), or in other storage accessible to execution circuitry.

As shown, execution circuitry 2403 executes a decoded TILEMOVE instruction to move the source data of the source matrix (tile) operand 2401 into corresponding data element positions of the destination matrix (tile) operand 2405.

Also shown are remaining (unconfigured) columns and rows being set to zero which is done in some embodiments. In some embodiments, a matrix (tile) is configured to use only a subset of the rows and columns possible. For example, a matrix (tile) may have up to 16 rows and columns to use, but only use 4 of each. The configuration of each matrix (tile) is typically done by the execution of a configuration instruction prior to matrix (tile) usage. In this example, there are N columns and M rows possible.

ii. EXEMPLARY FORMAT(S)

An embodiment of a format for a TILEMOVE instruction is TILEMOVE{B/W/D/Q} TMM1, TMM2. In some embodiments, TILEMOVE{B/W/D/Q} is the opcode mnemonic of the instruction where B/W/D/Q represent data element sizes (byte, word, double word, quadword) of the source and destination. TMM1 is a field for the destination matrix (tile) operand identifier. TMM2 is a field for a source matrix (tile) operand identifier. In some embodiments, the TMM2 field is a R/M value (such as 2846), the TMM1 field is REG 2844, and the data element size is found in 2865.

In embodiments, encodings of the instruction include a scale-index-base (SIB) type memory addressing operand that indirectly identifies multiple indexed destination locations in memory (e.g., field 2850). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

iii. EXEMPLARY METHODS(S) OF EXECUTION

Figure 25:
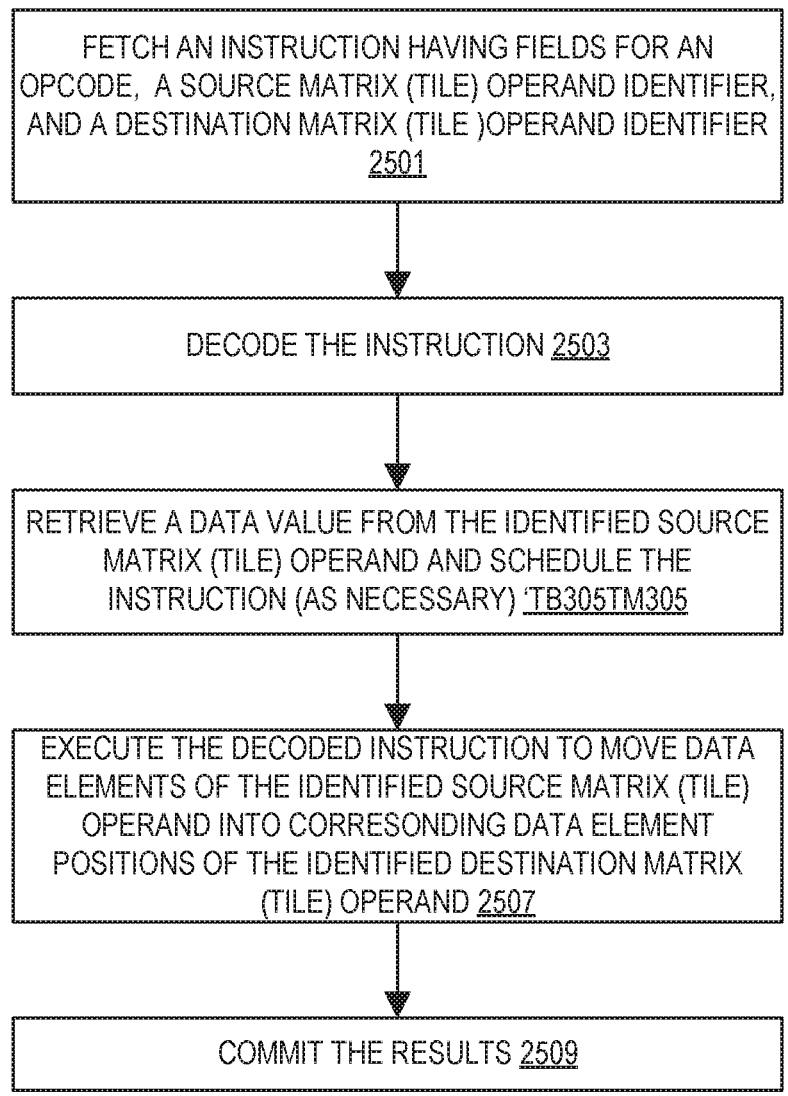
FIG. 25 illustrates an embodiment of method performed by a processor to process a TILEMOVE instruction.

FIG. 25 illustrates an embodiment of method performed by a processor to process a TILEMOVE instruction.

At 2501, an instruction is fetched. For example, a TILEMOVE instruction is fetched. The TILEMOVE instruction includes fields for an opcode, a source matrix (tile) operand identifier, and a destination matrix (tile) operand identifier. In some embodiments, the instruction is fetched from an instruction cache. The opcode of the TILEMOVE instruction indicates a move of the data from the identified source matrix (tile) operand to corresponding packed data element positions of the identified destination matrix (tile) operand is to occur, and a size of the data to be moved.

The fetched instruction is decoded at 2503. For example, the fetched TILEMOVE instruction is decoded by decode circuitry such as that detailed herein.

Data values associated with the source matrix (tile) operand of the decoded instruction are retrieved at 2505 and the decoded instruction is scheduled (as needed). For example, when the source matrix (tile) operand is a memory location, the data from the indicated memory location is retrieved.

At 2507, the decoded instruction is executed by execution circuitry (hardware) such as that detailed herein. For the TILEMOVE instruction, the execution will cause execution circuitry to move (write) every configured element position of the identified destination matrix (tile) operand with data from corresponding element positions of the identified source matrix (tile) operand. In some embodiments, unconfigured elements of rows of the destination matrix (tile) are zeroed. In some embodiments, instead of a write, the identified source matrix (tile) operand is renamed to be the identified destination matrix (tile) operand. This eliminates the need to do a move and instead uses a logical renaming.

In some embodiments, the instruction is committed or retired at 2509.

Figure 26:
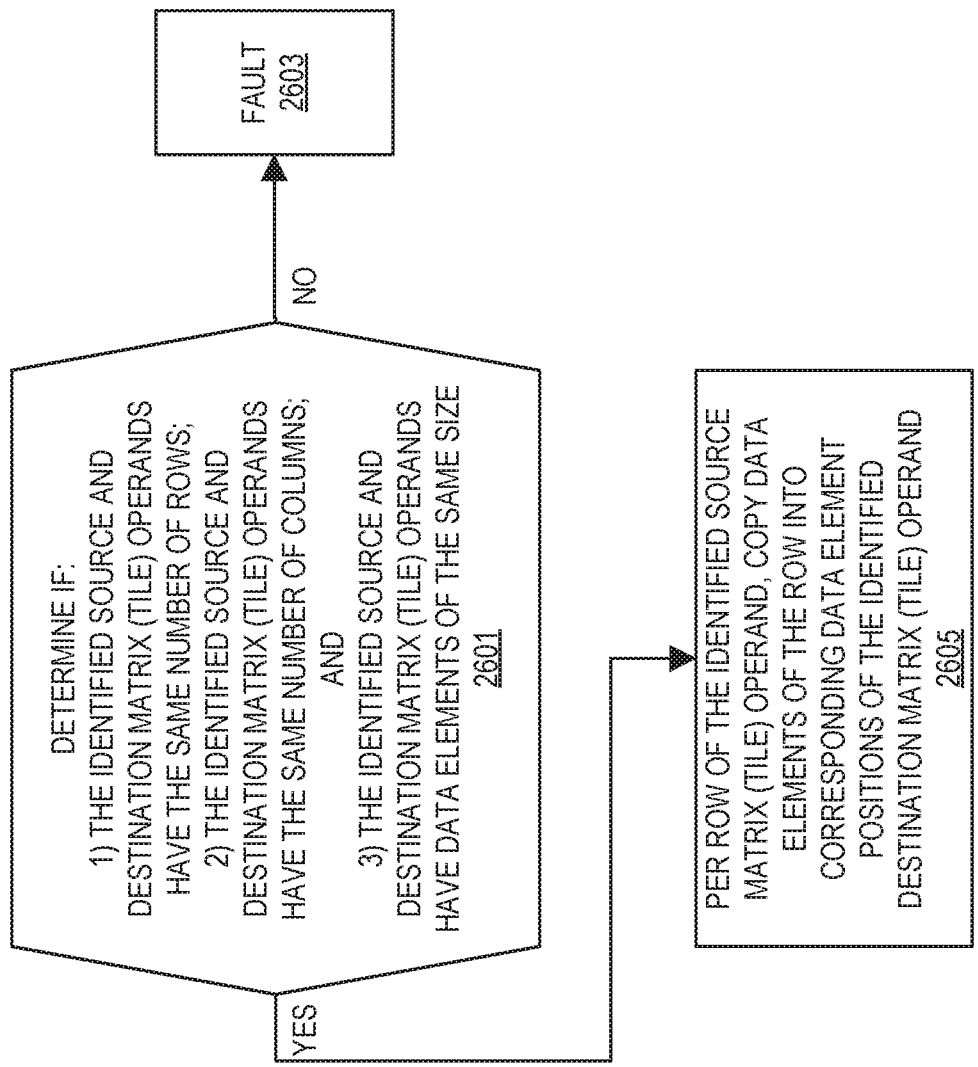
FIG. 26 illustrates a more detailed description of an execution of a TILEMOVE instruction.

FIG. 26 illustrates a more detailed description of an execution of a TILEMOVE instruction. Typically, this is performed by execution circuitry such as that detailed above.

At 2601, a determination of if one of the following is true is made: 1) Do the identified source and destination matrix (tile) operands have the same number of rows?; 2) Do the identified source and destination matrix (tile) operands have the same number of columns?; and 3) Do the identified source and destination matrix (tile) operands have data elements of the same size? If any of these is not true, then a fault is raised at 2603.

If all of these conditions are true, then the execution circuitry moves (writes), for each configured row of the identified destination matrix (tile) operand, data values from a corresponding row of the identified source matrix (tile) operand in corresponding data element positions (columns) at 2605. In some embodiments, unconfigured elements of rows of the destination matrix (tile) that do not have corresponding columns in the source matrix (tile) are zeroed.

iv. Exemplary Pseudocode

FIG. 27 illustrates exemplary pseudocode for the execution of a TILEMOVE instruction.

v. EXAMPLES

Example 1 A processor comprising: decode circuitry to decode an instruction having fields for an opcode, a source matrix operand identifier, and a destination matrix operand identifier; and execution circuitry to execute the decoded instruction to move each data element of the identified source matrix operand to corresponding data element position of the identified destination matrix operand.

Example 2 The processor of example 1, wherein the opcode defines a size of each data element of the source and destination matrix operands.

Example 3 The processor of example 2, wherein the size of each data element of the source and destination matrix operands is a doubleword.

Example 4 The processor of example 2, wherein the size of each data element of the source and destination matrix operands is a word.

Example 5 The processor of any of examples 1-4, wherein the execution circuitry is to move each row of the identified source matrix operand to a corresponding row of the destination matrix operand and zero any remaining columns of the identified destination matrix operand and unconfigured rows of the identified destination matrix operand.

Example 6 The processor of any of examples 1-5, wherein the source matrix operand is a plurality of registers to represent a matrix.

Example 7 The processor of any of examples 1-5, wherein the execution circuitry to fault upon a determination of one of: the identified source and destination matrix operands have different number of rows, the identified source and destination matrix operands have different number of columns, and the identified source and destination matrix operands have different sized data elements.

Example 8 A method comprising: decoding an instruction having fields for an opcode, a source matrix operand identifier, and a destination matrix operand identifier; and executing the decoded instruction to move each data element of the identified source matrix operand to corresponding data element position of the identified destination matrix operand.

Example 9 The method of example 8, wherein the opcode defines a size of each data element of the source and destination matrix operands.

Example 10 The method of example 9, wherein the size of each data element of the source and destination matrix operands is a doubleword.

Example 11 The method of example 9, wherein the size of each data element of the source and destination matrix operands is a word.

Example 12 The method of any of examples 8-11, wherein each row of the identified source matrix operand is moved to a corresponding row of the destination matrix operand and zero any remaining columns of the identified destination matrix operand and unconfigured rows of the identified destination matrix operand.

Example 13 The method of any of examples 8-12, wherein the source matrix operand is a plurality of registers to represent a matrix.

Example 14 The method of any of examples 8-13, further comprising: faulting upon a determination of one of: the identified source and destination matrix operands have different number of rows, the identified source and destination matrix operands have different number of columns, and the identified source and destination matrix operands have different sized data elements.

Example 15 A non-transitory machine-readable medium storing an instruction which causes a processor to perform a method, the method comprising: decoding an instruction having fields for an opcode, a source matrix operand identifier, and a destination matrix operand identifier; and executing the decoded instruction to move each data element of the identified source matrix operand to corresponding data element position of the identified destination matrix operand.

Example 16 The non-transitory machine-readable medium of example 15, wherein the opcode defines a size of each data element of the source and destination matrix operands.

Example 17 The non-transitory machine-readable medium of examples 16, wherein the size of each data element of the source and destination matrix operands is a doubleword.

Example 18 The non-transitory machine-readable medium of example 16, wherein the size of each data element of the source and destination matrix operands is a word.

Example 19 The non-transitory machine-readable medium of any of examples 15-18, wherein each row of the identified source matrix operand is moved to a corresponding row of the destination matrix operand and zero any remaining columns of the identified destination matrix operand and unconfigured rows of the identified destination matrix operand.

Example 20 The non-transitory machine-readable medium of any of examples 15-19, wherein the source matrix operand is a plurality of registers to represent a matrix.

Example 21 The non-transitory machine-readable medium of any of examples 15-20, further comprising: faulting upon a determination of one of: the identified source and destination matrix operands have different number of rows, the identified source and destination matrix operands have different number of columns, and the identified source and destination matrix operands have different sized data elements.

Example 22 A system comprising: a processor; and an accelerator coupled to the processor, the accelerator including: decode circuitry to decode an instruction having fields for an opcode, a source matrix operand identifier, and a destination matrix operand identifier; and execution circuitry to execute the decoded instruction to move each data element of the identified source matrix operand to corresponding data element position of the identified destination matrix operand.

Example 23 The system of example 22, wherein the opcode defines a size of each data element of the source and destination matrix operands.

Example 24 The system of any of examples 22-23, wherein the execution circuitry is to move each row of the identified source matrix operand to a corresponding row of the destination matrix operand and zero any remaining columns of the identified destination matrix operand and unconfigured rows of the identified destination matrix operand.

Example 24 The system of any of examples 22-24, wherein the source matrix operand is a plurality of registers to represent a matrix.

V. Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

A. Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 28A illustrates an exemplary instruction format including a VEX prefix 2802, real opcode field 2830, Mod R/M byte 2840, SIB byte 2850, displacement field 2862, and IMM8 2872. FIG. 28B illustrates which fields from FIG. 28A make up a full opcode field 2874 and a base operation field 2841. FIG. 28C illustrates which fields from FIG. 28A make up a register index field 2844.

VEX Prefix (Bytes 0-2) 2802 is encoded in a three-byte form. The first byte is the Format Field 2890 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 2805 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 2815 (VEX byte 1, bits [4:0]-mmmmm) includes content to encode an implied leading opcode byte. W Field 2864 (VEX byte 2, bit [7]-W)—is represented by the notation VEX.W, and provides different functions depending on the instruction. The role of VEX.vvvv 2820 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 2868 Size field (VEX byte 2, bit [2]-L)=0, it indicates 128 bit vector; if VEX.L=1, it indicates 256 bit vector. Prefix encoding field 2825 (VEX byte 2, bits [1:0]-pp) provides additional bits for the base operation field 2841.

Real Opcode Field 2830 (Byte 3) is also known as the opcode byte. Part of the opcode is specified in this field.

MOD R/M Field 2840 (Byte 4) includes MOD field 2842 (bits [7-6]), Reg field 2844 (bits [5-3]), and R/M field 2846 (bits [2-0]). The role of Reg field 2844 may include the following: encoding either the destination register operand or a source register operand (the rrr of Rrrr), or be treated as an opcode extension and not used to encode any instruction operand. The role of R/M field 2846 may include the following: encoding the instruction operand that references a memory address, or encoding either the destination register operand or a source register operand.

Scale, Index, Base (SIB)—The content of Scale field 2850 (Byte 5) includes SS2852 (bits [7-6]), which is used for memory address generation. The contents of SIB.xxx 2854 (bits [5-3]) and SIB.bbb 2856 (bits [2-0]) have been previously referred to with regard to the register indexes Xxxx and Bbbb.

The Displacement Field 2862 and the immediate field (IMM8) 2872 contain data.

B. Exemplary Register Architecture

FIG. 29 is a block diagram of a register architecture 2900 according to one embodiment of the invention. In the embodiment illustrated, there are 32 vector registers 2910 that are 512 bits wide; these registers are referenced as zmm0 through zmm31. The lower order 256 bits of the lower 32 zmm registers are overlaid on registers ymm0-15. The lower order 128 bits of the lower 32 zmm registers (the lower order 128 bits of the ymm registers) are overlaid on registers xmm0-15.

General-purpose registers 2925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2945, on which is aliased the MMX packed integer flat register file 2950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

In some embodiments, tiles 2920 are supported using an overlay over physical registers. For example, a tile may utilize 16 1,024-bit registers, 32 512-bit registers, etc. depending on the implementation.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

C. Exemplary Core Architectures

In-Order and Out-of-Order Core Block Diagram

FIG. 30A is a block diagram illustrating both an exemplary in-order pipeline and an exemplary register renaming, out-of-order issue/execution pipeline according to embodiments of the invention. FIG. 30B is a block diagram illustrating both an exemplary embodiment of an in-order architecture core and an exemplary register renaming, out-of-order issue/execution architecture core to be included in a processor according to embodiments of the invention. The solid lined boxes in FIGS. 30A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 30A, a processor pipeline 3000 includes a fetch stage 3002, a length decode stage 3004, a decode stage 3006, an allocation stage 3008, a renaming stage 3010, a scheduling (also known as a dispatch or issue) stage 3012, a register read/memory read stage 3014, an execute stage 3016, a write back/memory write stage 3018, an exception handling stage 3022, and a commit stage 3024.

FIG. 30B shows processor core 3090 including a front end unit 3030 coupled to an execution engine unit 3050, and both are coupled to a memory unit 3070. The core 3090 may be a reduced instruction set computing (RISC) core, a complex instruction set computing (CISC) core, a very long instruction word (VLIW) core, or a hybrid or alternative core type. As yet another option, the core 3090 may be a special-purpose core, such as, for example, a network or communication core, compression engine, coprocessor core, general purpose computing graphics processing unit (GPGPU) core, graphics core, or the like.

The front end unit 3030 includes a branch prediction unit 3032 coupled to an instruction cache unit 3034, which is coupled to an instruction translation lookaside buffer (TLB) 3036, which is coupled to an instruction fetch unit 3038, which is coupled to a decode unit 3040. The decode unit 3040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3090 includes a microcode ROM or other medium that stores microcode for certain macroinstructions (e.g., in decode unit 3040 or otherwise within the front end unit 3030). The decode unit 3040 is coupled to a rename/allocator unit 3052 in the execution engine unit 3050.

The execution engine unit 3050 includes the rename/allocator unit 3052 coupled to a retirement unit 3054 and a set of one or more scheduler unit(s) 3056. The scheduler unit(s) 3056 represents any number of different schedulers, including reservations stations, central instruction window, etc. The scheduler unit(s) 3056 is coupled to the physical register file(s) unit(s) 3058. Each of the physical register file(s) units 3058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3058 comprises a vector registers unit and a scalar registers unit. These register units may provide architectural vector registers, vector mask registers, and general purpose registers. The physical register file(s) unit(s) 3058 is overlapped by the retirement unit 3054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3054 and the physical register file(s) unit(s) 3058 are coupled to the execution cluster(s) 3060. The execution cluster(s) 3060 includes a set of one or more execution units 3062 and a set of one or more memory access units 3064. The execution units 3062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3056, physical register file(s) unit(s) 3058, and execution cluster(s) 3060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3064). It should also be understood that where separate pipelines are used, one or more of these pipelines may be out-of-order issue/execution and the rest in-order.

The set of memory access units 3064 is coupled to the memory unit 3070, which includes a data TLB unit 3072 coupled to a data cache unit 3074 coupled to a level 2 (L2) cache unit 3076. In one exemplary embodiment, the memory access units 3064 may include a load unit, a store address unit, and a store data unit, each of which is coupled to the data TLB unit 3072 in the memory unit 3070. The instruction cache unit 3034 is further coupled to a level 2 (L2) cache unit 3076 in the memory unit 3070. The L2 cache unit 3076 is coupled to one or more other levels of cache and eventually to a main memory.

By way of example, the exemplary register renaming, out-of-order issue/execution core architecture may implement the pipeline 3000 as follows: 1) the instruction fetch 3038 performs the fetch and length decoding stages 3002 and 3004; 2) the decode unit 3040 performs the decode stage 3006; 3) the rename/allocator unit 3052 performs the allocation stage 3008 and renaming stage 3010; 4) the scheduler unit(s) 3056 performs the schedule stage 3012; 5) the physical register file(s) unit(s) 3058 and the memory unit 3070 perform the register read/memory read stage 3014; the execution cluster 3060 perform the execute stage 3016; 6) the memory unit 3070 and the physical register file(s) unit(s) 3058 perform the write back/memory write stage 3018; 7) various units may be involved in the exception handling stage 3022; and 8) the retirement unit 3054 and the physical register file(s) unit(s) 3058 perform the commit stage 3024.

The core 3090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3034/3074 and a shared L2 cache unit 3076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 31B:
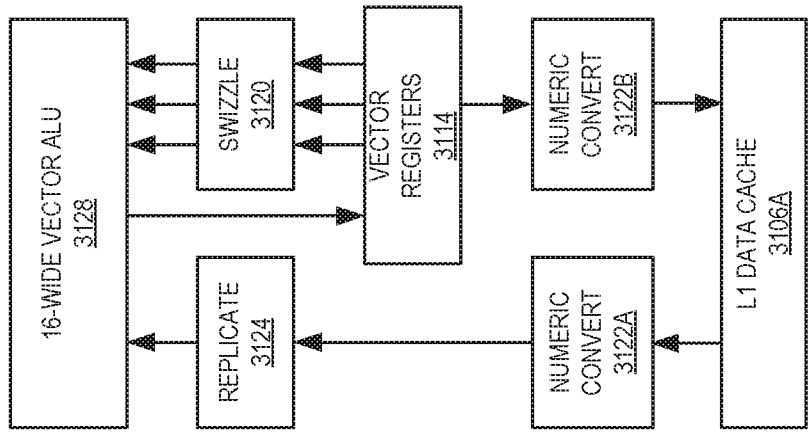
FIGS. 31A-B illustrate a block diagram of a more specific exemplary in-order core architecture, which core would be one of several logic blocks (including other cores of the same type and/or different types) in a chip.
Figure 31A:
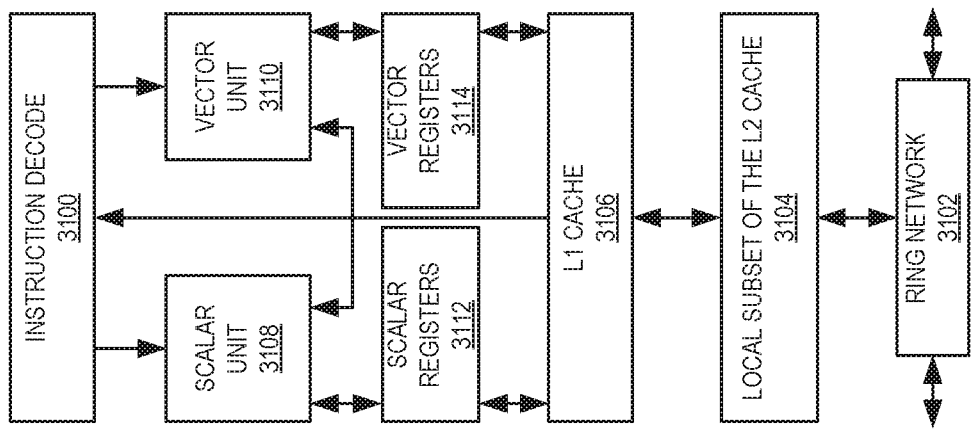

FIGS. 31A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 31A is a block diagram of a single processor core, along with its connection to the on-die interconnect network 3102 and with its local subset of the Level 2 (L2) cache 3104, according to embodiments of the invention. In one embodiment, an instruction decoder 3100 supports the x86 instruction set with a packed data instruction set extension. An L1 cache 3106 allows low-latency accesses to cache memory into the scalar and vector units. While in one embodiment (to simplify the design), a scalar unit 3108 and a vector unit 3110 use separate register sets (respectively, scalar registers 3112 and vector registers 3114) and data transferred between them is written to memory and then read back in from a level 1 (L1) cache 3106, alternative embodiments of the invention may use a different approach (e.g., use a single register set or include a communication path that allow data to be transferred between the two register files without being written and read back).

The local subset of the L2 cache 3104 is part of a global L2 cache that is divided into separate local subsets, one per processor core. Each processor core has a direct access path to its own local subset of the L2 cache 3104. Data read by a processor core is stored in its L2 cache subset 3104 and can be accessed quickly, in parallel with other processor cores accessing their own local L2 cache subsets. Data written by a processor core is stored in its own L2 cache subset 3104 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 31B is an expanded view of part of the processor core in FIG. 31A according to embodiments of the invention. FIG. 31B includes an L1 data cache 3106A part of the L1 cache 3104, as well as more detail regarding the vector unit 3110 and the vector registers 3114. Specifically, the vector unit 3110 is a 32-wide vector processing unit (VPU) (see the 16-wide ALU 3128), which executes one or more of integer, single-precision float, and double-precision float instructions. The VPU supports swizzling the register inputs with swizzle unit 3120, numeric conversion with numeric convert units 3122A-B, and replication with replication unit 3124 on the memory input.

Processor with Integrated Memory Controller and Graphics

Figure 32:
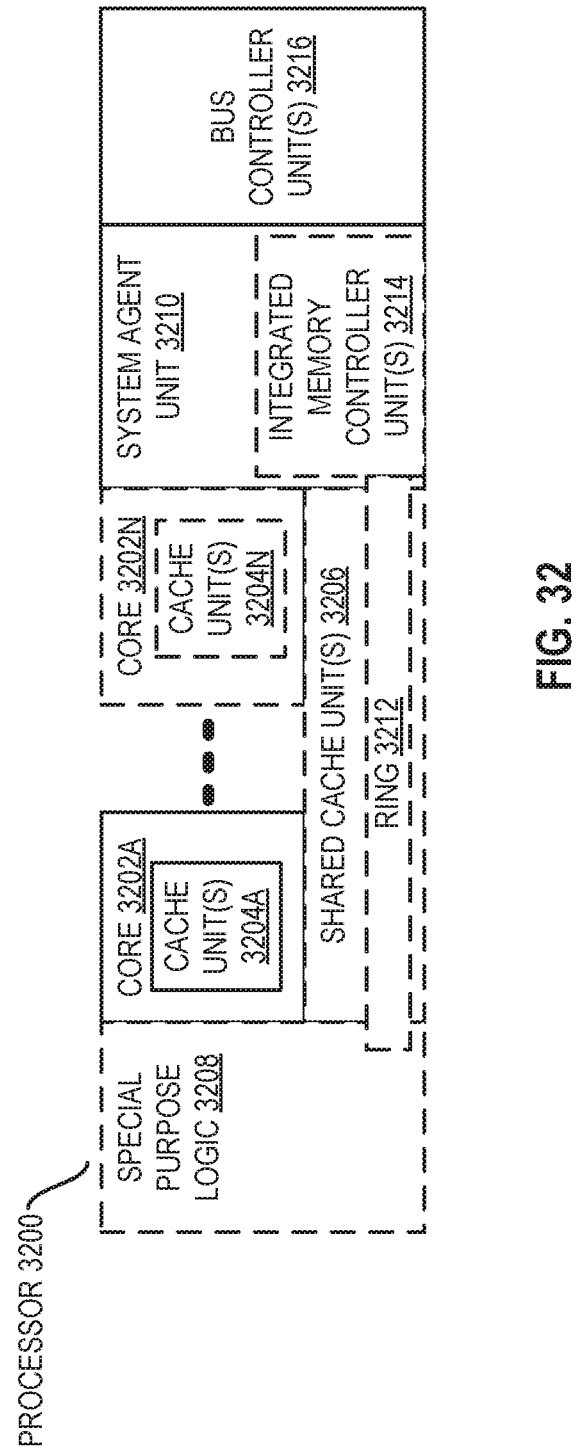
FIG. 32 is a block diagram of a processor 3200 that may have more than one core, may have an integrated memory controller, and may have integrated graphics according to embodiments of the invention.

FIG. 32 is a block diagram of a processor 3200 that may have more than one core, may have an integrated memory controller, and may have integrated graphics according to embodiments of the invention. The solid lined boxes in FIG. 32 illustrate a processor 3200 with a single core 3202A, a system agent 3210, a set of one or more bus controller units 3216, while the optional addition of the dashed lined boxes illustrates an alternative processor 3200 with multiple cores 3202A-N, a set of one or more integrated memory controller unit(s) 3214 in the system agent unit 3210, and special purpose logic 3208.

Thus, different implementations of the processor 3200 may include: 1) a CPU with the special purpose logic 3208 being integrated graphics and/or scientific (throughput) logic (which may include one or more cores), and the cores 3202A-N being one or more general purpose cores (e.g., general purpose in-order cores, general purpose out-of-order cores, a combination of the two); 2) a coprocessor with the cores 3202A-N being a large number of special purpose cores intended primarily for graphics and/or scientific (throughput); and 3) a coprocessor with the cores 3202A-N being a large number of general purpose in-order cores. Thus, the processor 3200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3200 may be a part of and/or may be implemented on one or more substrates using any of a number of process technologies, such as, for example, BiCMOS, CMOS, or NMOS.

The memory hierarchy includes one or more levels of cache within the cores 3204A-N, a set or one or more shared cache units 3206, and external memory (not shown) coupled to the set of integrated memory controller units 3214. The set of shared cache units 3206 may include one or more mid-level caches, such as level 2 (L2), level 3 (L3), level 4 (L4), or other levels of cache, a last level cache (LLC), and/or combinations thereof. While in one embodiment a ring based interconnect unit 3212 interconnects the integrated graphics logic 3208, the set of shared cache units 3206, and the system agent unit 3210/integrated memory controller unit(s) 3214, alternative embodiments may use any number of well-known techniques for interconnecting such units. In one embodiment, coherency is maintained between one or more cache units 3206 and cores 3202-A-N.

In some embodiments, one or more of the cores 3202A-N are capable of multithreading. The system agent 3210 includes those components coordinating and operating cores 3202A-N. The system agent unit 3210 may include for example a power control unit (PCU) and a display unit. The PCU may be or include logic and components needed for regulating the power state of the cores 3202A-N and the integrated graphics logic 3208. The display unit is for driving one or more externally connected displays.

The cores 3202A-N may be homogenous or heterogeneous in terms of architecture instruction set; that is, two or more of the cores 3202A-N may be capable of execution the same instruction set, while others may be capable of executing only a subset of that instruction set or a different instruction set.

D. Exemplary Computer Architectures

FIGS. 33-36 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 33:
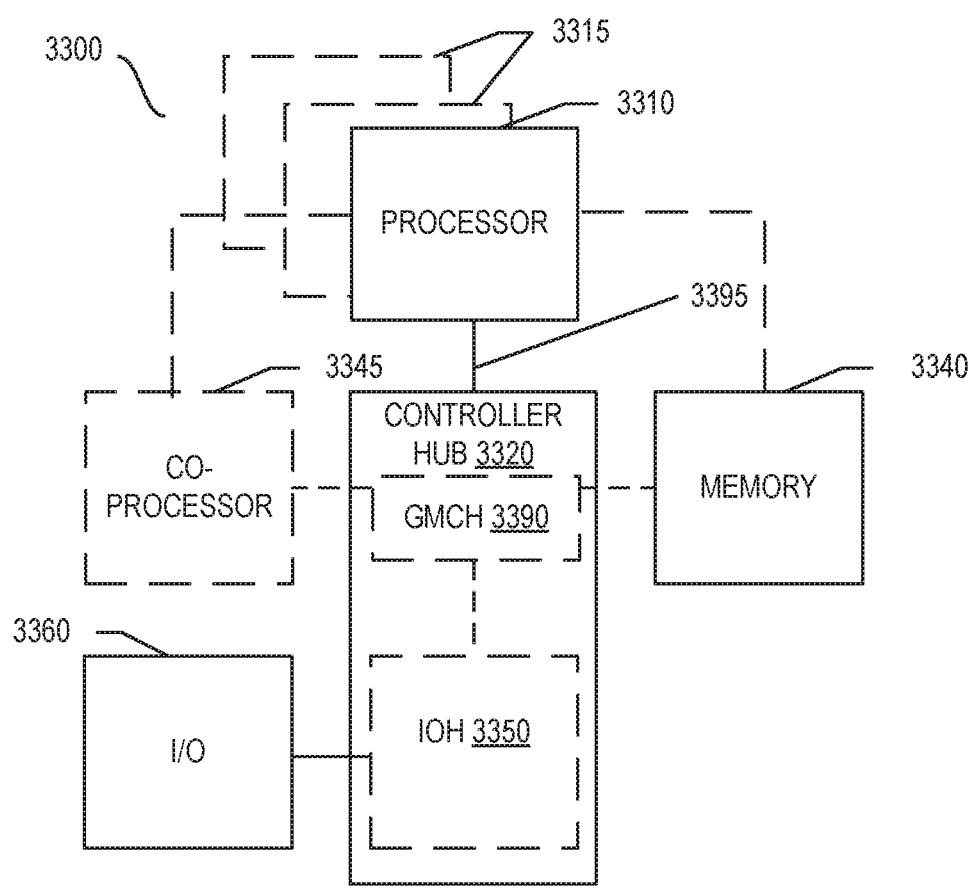
FIGS. 33-36 are block diagrams of exemplary computer architectures.

Referring now to FIG. 33, shown is a block diagram of a system 3300 in accordance with one embodiment of the present invention. The system 3300 may include one or more processors 3310, 3315, which are coupled to a controller hub 3320. In one embodiment, the controller hub 3320 includes a graphics memory controller hub (GMCH) 3390 and an Input/Output Hub (IOH) 3350 (which may be on separate chips); the GMCH 3390 includes memory and graphics controllers to which are coupled memory 3340 and a coprocessor 3345; the IOH 3350 is couples input/output (I/O) devices 3360 to the GMCH 3390. Alternatively, one or both of the memory and graphics controllers are integrated within the processor (as described herein), the memory 3340 and the coprocessor 3345 are coupled directly to the processor 3310, and the controller hub 3320 in a single chip with the IOH 3350.

The optional nature of additional processors 3315 is denoted in FIG. 33 with broken lines. Each processor 3310, 3315 may include one or more of the processing cores described herein and may be some version of the processor 3200.

The memory 3340 may be, for example, dynamic random access memory (DRAM), phase change memory (PCM), or a combination of the two. For at least one embodiment, the controller hub 3320 communicates with the processor(s) 3310, 3315 via a multi-drop bus, such as a frontside bus (FSB), point-to-point interface, or similar connection 3395.

In one embodiment, the coprocessor 3345 is a special-purpose processor, such as, for example, a high-throughput MIC processor, a network or communication processor, compression engine, graphics processor, GPGPU, embedded processor, or the like. In one embodiment, controller hub 3320 may include an integrated graphics accelerator.

There can be a variety of differences between the physical resources 3310, 33155 in terms of a spectrum of metrics of merit including architectural, microarchitectural, thermal, power consumption characteristics, and the like.

In one embodiment, the processor 3310 executes instructions that control data processing operations of a general type. Embedded within the instructions may be coprocessor instructions. The processor 3310 recognizes these coprocessor instructions as being of a type that should be executed by the attached coprocessor 3345. Accordingly, the processor 3310 issues these coprocessor instructions (or control signals representing coprocessor instructions) on a coprocessor bus or other interconnect, to coprocessor 3345. Coprocessor(s) 3345 accept and execute the received coprocessor instructions.

Figure 34:
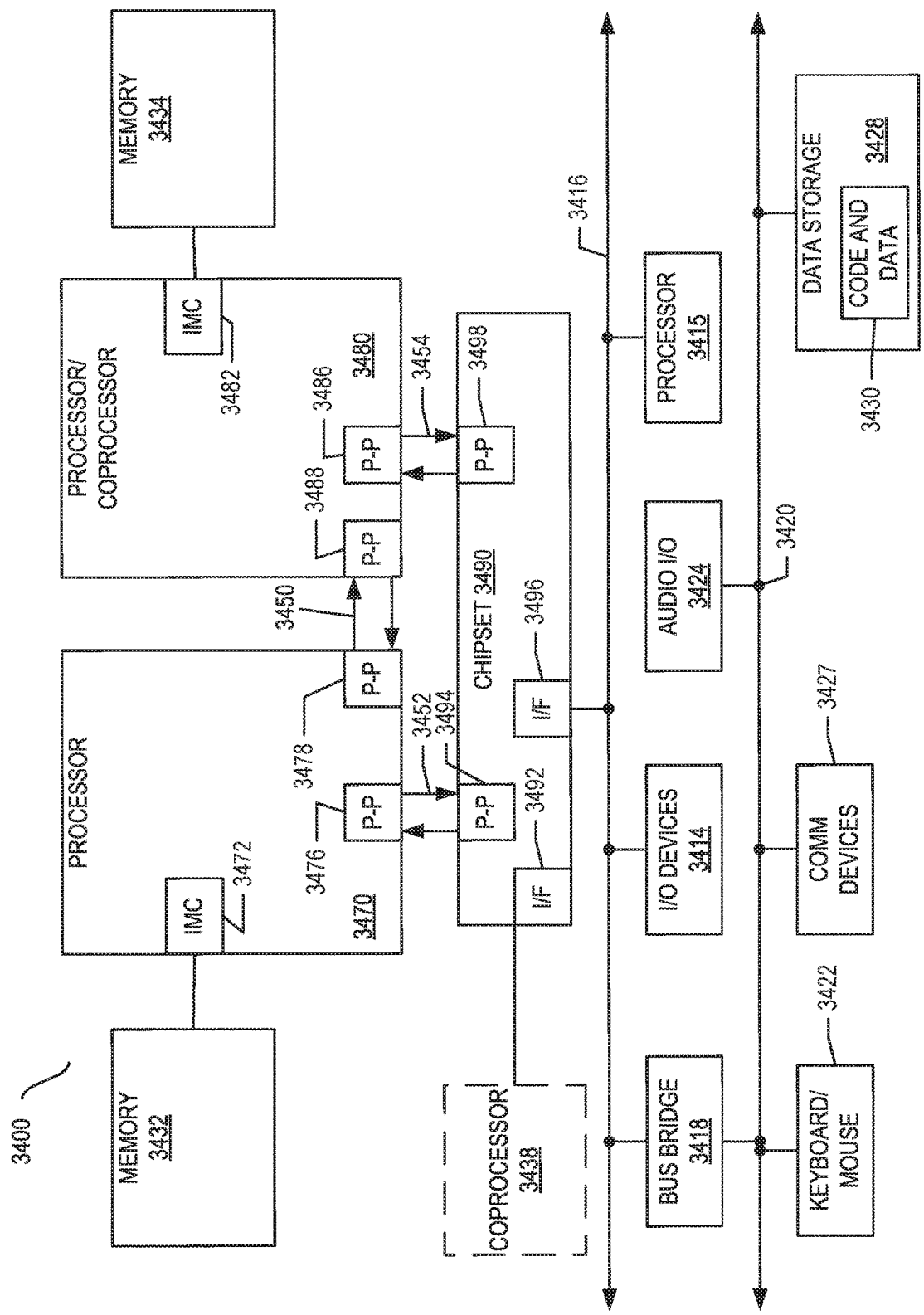

Referring now to FIG. 34, shown is a block diagram of a first more specific exemplary system 3400 in accordance with an embodiment of the present invention. As shown in FIG. 34, multiprocessor system 3400 is a point-to-point interconnect system, and includes a first processor 3470 and a second processor 3480 coupled via a point-to-point interconnect 3450. Each of processors 3470 and 3480 may be some version of the processor 3200. In one embodiment of the invention, processors 3470 and 3480 are respectively processors 3310 and 3315, while coprocessor 3438 is coprocessor 3345. In another embodiment, processors 3470 and 3480 are respectively processor 3310 coprocessor 3345.

Processors 3470 and 3480 are shown including integrated memory controller (IMC) units 3472 and 3482, respectively. Processor 3470 also includes as part of its bus controller units point-to-point (P-P) interfaces 3476 and 3478; similarly, second processor 3480 includes P-P interfaces 3486 and 3488. Processors 3470, 3480 may exchange information via a point-to-point (P-P) interface 3450 using P-P interface circuits 3478, 3488. As shown in FIG. 34, IMCs 3472 and 3482 couple the processors to respective memories, namely a memory 3432 and a memory 3434, which may be portions of main memory locally attached to the respective processors.

Processors 3470, 3480 may each exchange information with a chipset 3490 via individual P-P interfaces 3452, 3454 using point to point interface circuits 3476, 3494, 3486, 3498. Chipset 3490 may optionally exchange information with the coprocessor 3438 via a high-performance interface 3492. In one embodiment, the coprocessor 3438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3490 may be coupled to a first bus 3416 via an interface 3496. In one embodiment, first bus 3416 may be a Peripheral Component Interconnect (PCI) bus, or a bus such as a PCI Express bus or another I/O interconnect bus, although the scope of the present invention is not so limited.

As shown in FIG. 34, various I/O devices 3414 may be coupled to first bus 3416, along with a bus bridge 3418 which couples first bus 3416 to a second bus 3420. In one embodiment, one or more additional processor(s) 3415, such as coprocessors, high-throughput MIC processors, GPGPU's, accelerators (such as, e.g., graphics accelerators or digital signal processing (DSP) units), field programmable gate arrays, or any other processor, are coupled to first bus 3416. In one embodiment, second bus 3420 may be a low pin count (LPC) bus. Various devices may be coupled to a second bus 3420 including, for example, a keyboard and/or mouse 3422, communication devices 3427 and a storage unit 3428 such as a disk drive or other mass storage device which may include instructions/code and data 3430, in one embodiment. Further, an audio I/O 3424 may be coupled to the second bus 3416. Note that other architectures are possible. For example, instead of the point-to-point architecture of FIG. 34, a system may implement a multi-drop bus or other such architecture.

Figure 35:
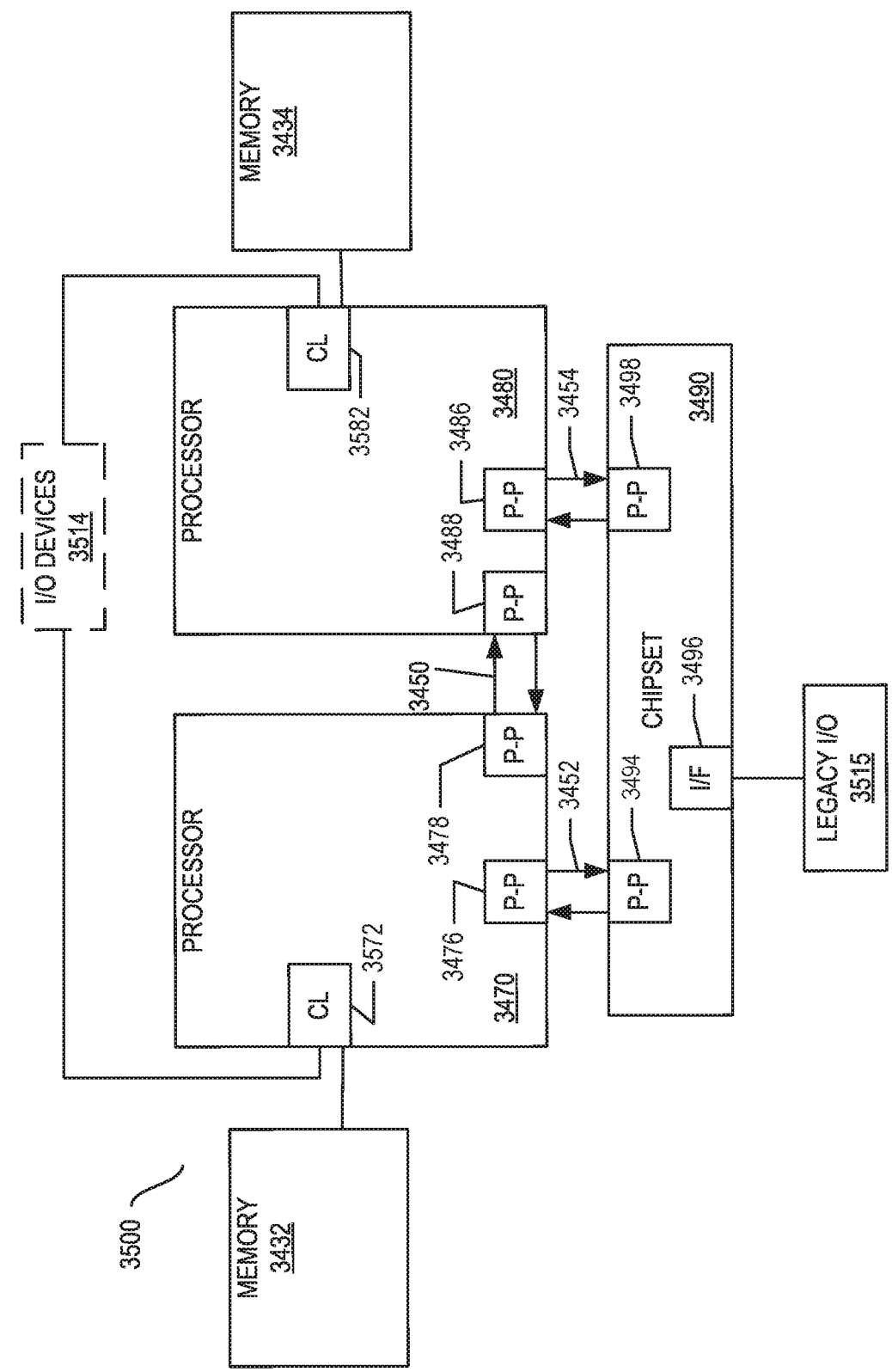

Referring now to FIG. 35, shown is a block diagram of a second more specific exemplary system 3500 in accordance with an embodiment of the present invention. Like elements in FIGS. 34 and 35 bear like reference numerals, and certain aspects of FIG. 34 have been omitted from FIG. 35 in order to avoid obscuring other aspects of FIG. 35.

FIG. 35 illustrates that the processors 3470, 3480 may include integrated memory and I/O control logic ("CL") 3572 and 3582, respectively. Thus, the CL 3572, 3582 include integrated memory controller units and include I/O control logic. FIG. 35 illustrates that not only are the memories 3432, 3434 coupled to the CL 3572, 3582, but also that I/O devices 3514 are also coupled to the control logic 3472, 3482. Legacy I/O devices 3515 are coupled to the chipset 3490.

Figure 36:
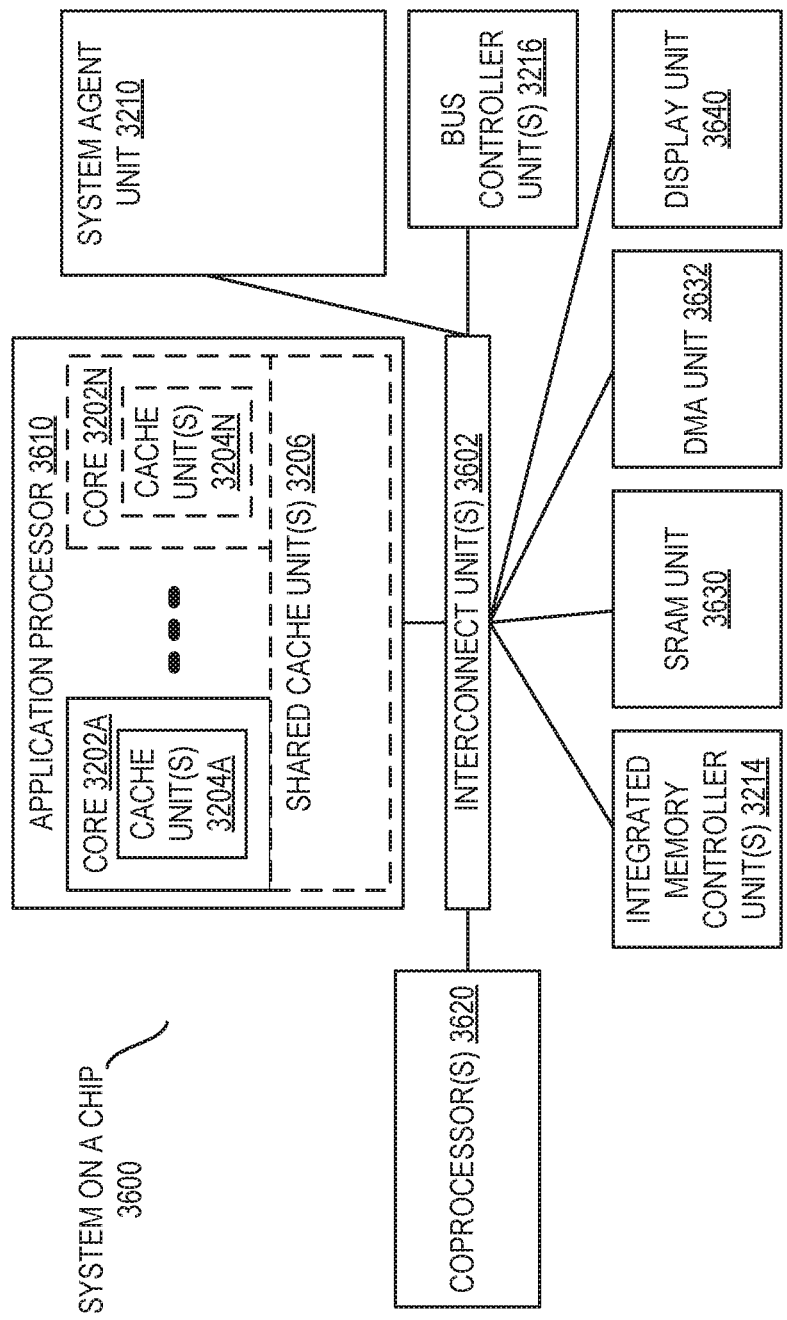

Referring now to FIG. 36, shown is a block diagram of a SoC 3600 in accordance with an embodiment of the present invention. Similar elements in FIG. 32 bear like reference numerals. Also, dashed lined boxes are optional features on more advanced SoCs. In FIG. 36, an interconnect unit(s) 3602 is coupled to: an application processor 3610 which includes a set of one or more cores 362A-N, cache units 3204A-N, and shared cache unit(s) 3206; a system agent unit 3210; a bus controller unit(s) 3216; an integrated memory controller unit(s) 3214; a set or one or more coprocessors 3620 which may include integrated graphics logic, an image processor, an audio processor, and a video processor; an static random access memory (SRAM) unit 3630; a direct memory access (DMA) unit 3632; and a display unit 3640 for coupling to one or more external displays. In one embodiment, the coprocessor(s) 3620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 3430 illustrated in FIG. 34, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

E. Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 37:
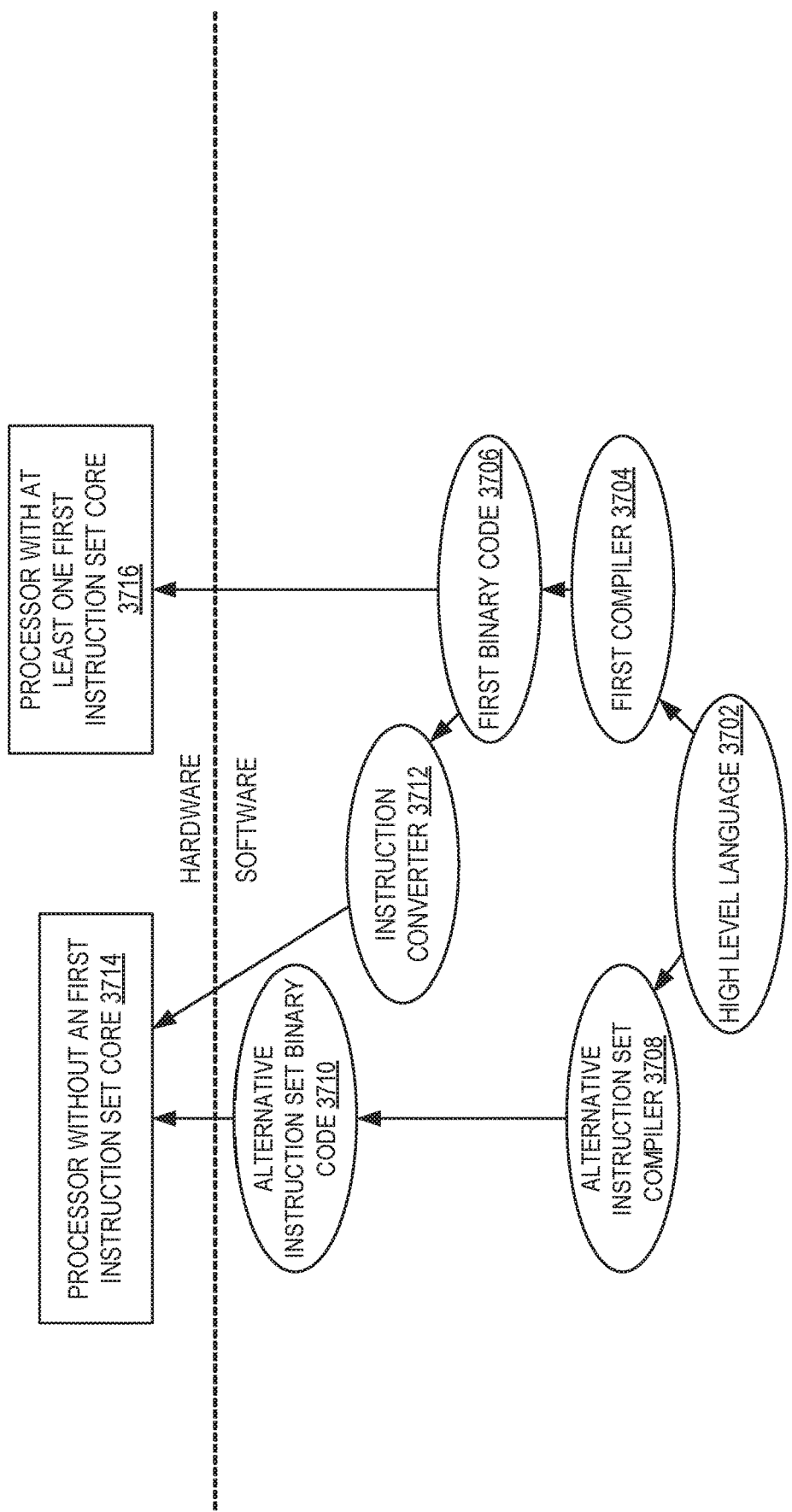
FIG. 37 is a block diagram contrasting the use of a software instruction converter to convert binary instructions in a source instruction set to binary instructions in a target instruction set according to embodiments of the invention.

FIG. 37 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 37 shows a program in a high level language 3702 may be compiled using an first compiler 3704 to generate a first binary code (e.g., x86) 3706 that may be natively executed by a processor with at least one first instruction set core 3716. In some embodiments, the processor with at least one first instruction set core 3716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 3704 represents a compiler that is operable to generate binary code of the first instruction set 3706 (e.g., object code) that can, with or without additional linkage processing, be executed on the processor with at least one first instruction set core 3716. Similarly, FIG. 37 shows the program in the high level language 3702 may be compiled using an alternative instruction set compiler 3708 to generate alternative instruction set binary code 3710 that may be natively executed by a processor without at least one first instruction set core 3714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3712 is used to convert the first binary code 3706 into code that may be natively executed by the processor without an first instruction set core 3714. This converted code is not likely to be the same as the alternative instruction set binary code 3710 because an instruction converter capable of this is difficult to make; however, the converted code will accomplish the general operation and be made up of instructions from the alternative instruction set. Thus, the instruction converter 3712 represents software, firmware, hardware, or a combination thereof that, through emulation, simulation or any other process, allows a processor or other electronic device that does not have a first instruction set processor or core to execute the first binary code 3706.

We claim:

1. An apparatus comprising:
    decode circuitry to decode an instruction having fields for an opcode, a source matrix operand identifier, and a destination matrix operand identifier, wherein the opcode is to indicate that execution circuitry is to move each data element of the identified source matrix operand to corresponding data element position of the identified destination matrix operand; and
    execution circuitry to execute the decoded instruction according to the opcode to move each data element of the identified source matrix operand to corresponding data element position of the identified destination matrix operand, wherein the execution circuitry is to move each row of the identified source matrix operand to a corresponding row of the destination matrix operand and zero any remaining columns of the identified destination matrix operand and unconfigured rows of the identified destination matrix operand.

2. The apparatus of claim 1, wherein the opcode defines a size of each data element of the source and destination matrix operands.

3. The apparatus of claim 2, wherein the size of each data element of the source and destination matrix operands is a doubleword.

4. The apparatus of claim 2, wherein the size of each data element of the source and destination matrix operands is a word.

5. The apparatus of claim 1, wherein the source matrix operand is a plurality of registers to represent a matrix.

6. The apparatus of claim 1, wherein the execution circuitry is to fault upon a determination of one of: the identified source and destination matrix operands have different number of rows, the identified source and destination matrix operands have different number of columns, and the identified source and destination matrix operands have different sized data elements.

7. A method comprising:
    decoding an instruction having fields for an opcode, a source matrix operand identifier, and a destination matrix operand identifier, wherein the opcode is to indicate that execution circuitry is to move each data element of the identified source matrix operand to corresponding data element position of the identified destination matrix operand; and
    executing the decoded instruction to move each data element of the identified source matrix operand to corresponding data element position of the identified destination matrix operand, wherein each row of the identified source matrix operand is moved to a corresponding row of the destination matrix operand and zero any remaining columns of the identified destination matrix operand and unconfigured rows of the identified destination matrix operand.

8. The method of claim 7, wherein the opcode defines a size of each data element of the source and destination matrix operands.

9. The method of claim 8, wherein the size of each data element of the source and destination matrix operands is a doubleword.

10. The method of claim 8, wherein the size of each data element of the source and destination matrix operands is a word.

11. The method of claim 7, wherein the source matrix operand is a plurality of registers to represent a matrix.

12. The method of claim 7, further comprising:
faulting upon a determination of one of: the identified source and destination matrix operands have different number of rows, the identified source and destination matrix operands have different number of columns, and the identified source and destination matrix operands have different sized data elements.

13. A non-transitory machine-readable medium storing an instruction which causes a processor to perform a method, the method comprising:
decoding the instruction having fields for an opcode, a source matrix operand identifier, and a destination matrix operand identifier, wherein the opcode is to indicate that execution circuitry is to move each data element of the identified source matrix operand to corresponding data element position of the identified destination matrix operand; and
executing the decoded instruction to move each data element of the identified source matrix operand to corresponding data element position of the identified destination matrix operand, wherein each row of the identified source matrix operand is moved to a corresponding row of the destination matrix operand and zero any remaining columns of the identified destination matrix operand and unconfigured rows of the identified destination matrix operand.

14. The non-transitory machine-readable medium of claim 13, wherein the opcode defines a size of each data element of the source and destination matrix operands.

15. The non-transitory machine-readable medium of claim 14, wherein the size of each data element of the source and destination matrix operands is a doubleword.

16. The non-transitory machine-readable medium of claim 14, wherein the size of each data element of the source and destination matrix operands is a word.

17. A system comprising:
a processor; and
an accelerator coupled to the processor, the accelerator including:
decode circuitry to decode an instruction having fields for an opcode, a source matrix operand identifier, and a destination matrix operand identifier, wherein the opcode is to indicate that execution circuitry is to move each data element of the identified source matrix operand to corresponding data element position of the identified destination matrix operand; and
execution circuitry to execute the decoded instruction to move each data element of the identified source matrix operand to corresponding data element position of the identified destination matrix operand, wherein each row of the identified source matrix operand is moved to a corresponding row of the destination matrix operand and zero any remaining columns of the identified destination matrix operand and unconfigured rows of the identified destination matrix operand.

* * * * *